US009971469B2

(12) United States Patent
Pacalin et al.

(10) Patent No.: US 9,971,469 B2

(45) Date of Patent: May 15, 2018

(54) METHOD AND SYSTEM FOR PRESENTING BUSINESS INTELLIGENCE INFORMATION THROUGH INFOLETS

(71) Applicant: ORACLE INTERNATIONAL CORPORATION, Redwood Shores, CA (US)

(72) Inventors: Laurent Frederic Pacalin, Portola Valley, CA (US); Muhammad Rehman, San Jose, CA (US); Mark Alan Kleidon, Livermore, CA (US); Jeremy Robert Walter Ashley, San Francisco, CA (US); Jatin Pinakin Thaker, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 536 days.

(21) Appl. No.: 14/611,111

(22) Filed: Jan. 30, 2015

(65) Prior Publication Data

US 2016/0224194 A1 Aug. 4, 2016

(51) Int. Cl.

| | |
|---|---|
| ***G06F 3/048*** | (2013.01) |
| ***G06F 3/0481*** | (2013.01) |
| ***G06F 3/0484*** | (2013.01) |
| ***G06Q 10/00*** | (2012.01) |
| ***G06F 17/30*** | (2006.01) |

(52) U.S. Cl.

CPC .......... *G06F 3/0481* (2013.01); *G06F 3/0484* (2013.01); *G06F 17/30716* (2013.01); *G06Q 10/00* (2013.01)

(58) Field of Classification Search

None

See application file for complete search history.

(56) References Cited

U.S. PATENT DOCUMENTS

| | | | |
|---|---|---|---|
| 7,536,686 | B2 | 5/2009 | Tan |
| 9,094,744 | B1 | 7/2015 | Lu |
| 2005/0055275 | A1 | 3/2005 | Newman |
| 2007/0162420 | A1 | 7/2007 | Ou |
| 2008/0084573 | A1 | 4/2008 | Horowitz |

(Continued)

OTHER PUBLICATIONS

Non-final Office Action dated Mar. 23, 2017 for related U.S. Appl. No. 14/611,146.

(Continued)

*Primary Examiner* — William C Trapanese

(74) *Attorney, Agent, or Firm* — Vista IP Law Group, LLP

(57) ABSTRACT

Disclosed is an improved method, system, and program product to implement an integrated enterprise application that provides a series of user interfaces to a user. The series of user interfaces may be configured to display multiple depths of information pertaining to one or more datasets. A first user interface of the series of user interfaces comprises a display component displaying a first depth information pertaining to a particular dataset. In response to the display component being selected, a second user interface is provided displaying a second depth information pertaining to the particular dataset. At least a portion of the first depth information is retrieved from a first enterprise application and at least a portion of the second depth information is retrieved from a second enterprise application.

26 Claims, 22 Drawing Sheets

800

Authorize user based on login credentials 801

Display infolets configured for the user in Glance View 802

Receive user input indicating a selection of at least one infolet of the Glance View 803

Identify database object based on received user input 804

Look-up corresponding data report based on the identified database object 805

Initiate action event to display the corresponding data report 806

Display Scan view of the corresponding data report 807

(56) References Cited

U.S. PATENT DOCUMENTS

2008/0109445 A1 5/2008 Williams
2008/0201248 A1 8/2008 Wellons
2009/0089078 A1 4/2009 Bursey
2009/0234860 A1 9/2009 Brown
2011/0296336 A1 12/2011 Law
2012/0035992 A1 2/2012 Tanaka
2013/0144855 A1 6/2013 Kaul
2013/0187926 A1 7/2013 Silverstein
2013/0218923 A1 8/2013 Kaul
2013/0282509 A1 10/2013 Strong
2013/0290244 A1 10/2013 Nucci
2013/0290381 A1 10/2013 Nucci
2014/0181020 A1 6/2014 Kreindlina
2014/0280193 A1 9/2014 Cronin
2014/0280808 A1 9/2014 Du
2014/0351241 A1 11/2014 Leask
2014/0351261 A1 11/2014 Aswani
2015/0120532 A1 4/2015 Jung
2015/0193531 A1* 7/2015 Mandelstein ..... G06F 17/30604 707/794
2015/0242106 A1* 8/2015 Penha ................. G06F 3/04847 715/854
2015/0317572 A1 11/2015 Balasubramanian
2016/0224615 A1 8/2016 Rehman et al.
2016/0224633 A1 8/2016 Rehman et al.
2016/0267503 A1 9/2016 Zakai-Or

OTHER PUBLICATIONS

Non-final Office Action dated Apr. 10, 2017 for related U.S. Appl. No. 14/611,132.

Akel, Laura, "Oracle ADF 11g Primer-Introduction to the building blocks of a Fusion Web application," An Oracle White Paper, Apr. 2007.

Pundpal, Anupama, "Oracle Fusion Applications", Installation Guide, 11g Release 8, Jun. 2014, 738 pages.

Hobin, Dona, "Oracle Fusion Middleware", User's Guide for Oracle Business Intelligence Enterprise Edition (Oracle Fusion Applications Edition), 11 g Release 1, Jun. 2012, 988 pages.

Notice of Allowance and Fee(s) due dated Sep. 12, 2017 for related U.S. Appl. No. 14/611,146.

Final Office Action dated Sep. 14, 2017 for related U.S. Appl. No. 14/611,132.

Notice of Allowance and Fee(s) due dated Jan. 12, 2018 for related U.S. Appl. No. 14/611,132.

* cited by examiner

METHOD AND SYSTEM FOR PRESENTING BUSINESS INTELLIGENCE INFORMATION THROUGH INFOLETS

CROSS-REFERENCE TO RELATED APPLICATION(S)

This application is cross-related to U.S. patent application Ser. No. 14/611,146 filed concurrently entitled "METHOD AND SYSTEM FOR IMPLEMENTING HISTORICAL TRENDING FOR BUSINESS RECORDS," and U.S. patent application Ser. No. 14/611,132 filed concurrently entitled "METHOD AND SYSTEM FOR EMBEDDING THIRD PARTY DATA INTO A SAAS BUSINESS PLATFORM,". The content of the aforementioned patent applications is hereby expressly incorporated by reference in its entirety.

BACKGROUND

Enterprise software solutions are widely used by various companies to provide useful tools to their respective employees including those related to communication, productivity, analysis and others. For example, the enterprise software system may be a sales productivity tool, such as Oracle SalesCloud®, etc., to enable sales representatives to easily access sales information, opportunities, analysis tools, etc. It should be appreciated that enterprise software, when leveraged correctly, can prove to be a key functionality for businesses to maximize efficiency for its employees and ultimately improve product quality. However, the success of any particular enterprise software solution is directly related to rates of adoption of the enterprise software within the company, user-friendliness, and the ability of the enterprise software to intelligently provide the necessary solutions to the employee based on the employee's individual needs.

There are numerous challenges in providing such an enterprise software solution to employees. Current approaches require employees to go back and forth between different applications, often requiring context switching and focus shifting on part of the user. For example, the employee may have to use a first application to access transactional business data, and yet another application to access analytical business data. This may prove to be time consuming, inefficient, and confusing for users. Typically, these problems tend to exist in most applications, regardless of how well applications are developed as different applications take different approaches to providing different types of data.

There may be a few solutions to solve the problems highlighted above, but they cannot be solved by merely writing better software applications. Thus, a new approach is needed in the context of enterprise software solutions.

SUMMARY

Some embodiments of the invention address the above problems by providing an approach to present enterprise data to a user through an integrated enterprise platform. In one aspect, a method provides, through an integrated enterprise platform, a series of user interfaces to sequentially display multiple depths of information pertaining to one or more datasets. A first user interface comprising one or more display components may be provided. A display component of the one or more display components may display a first depth information pertaining to a particular dataset. In one or more embodiments, the display component may be selected. In one or more embodiments, in response to the selected display component of the first user interface, a second user interface displaying a second depth information pertaining to the particular dataset may be provided. The second depth may be a more detailed depth as compared to the first depth. In one or more embodiments, at least one portion of the first depth information may be retrieved from a first enterprise application and at least one portion of the second depth of the particular dataset may be retrieved from a second enterprise application.

Further details of aspects, objects, and advantages of the invention(s) are described below in the detailed description, drawings, and claims. Both the foregoing general description and the following detailed description are exemplary and explanatory, and are not intended to be limiting as to the scope of the invention(s).

DETAILED DESCRIPTION

Figure 1:
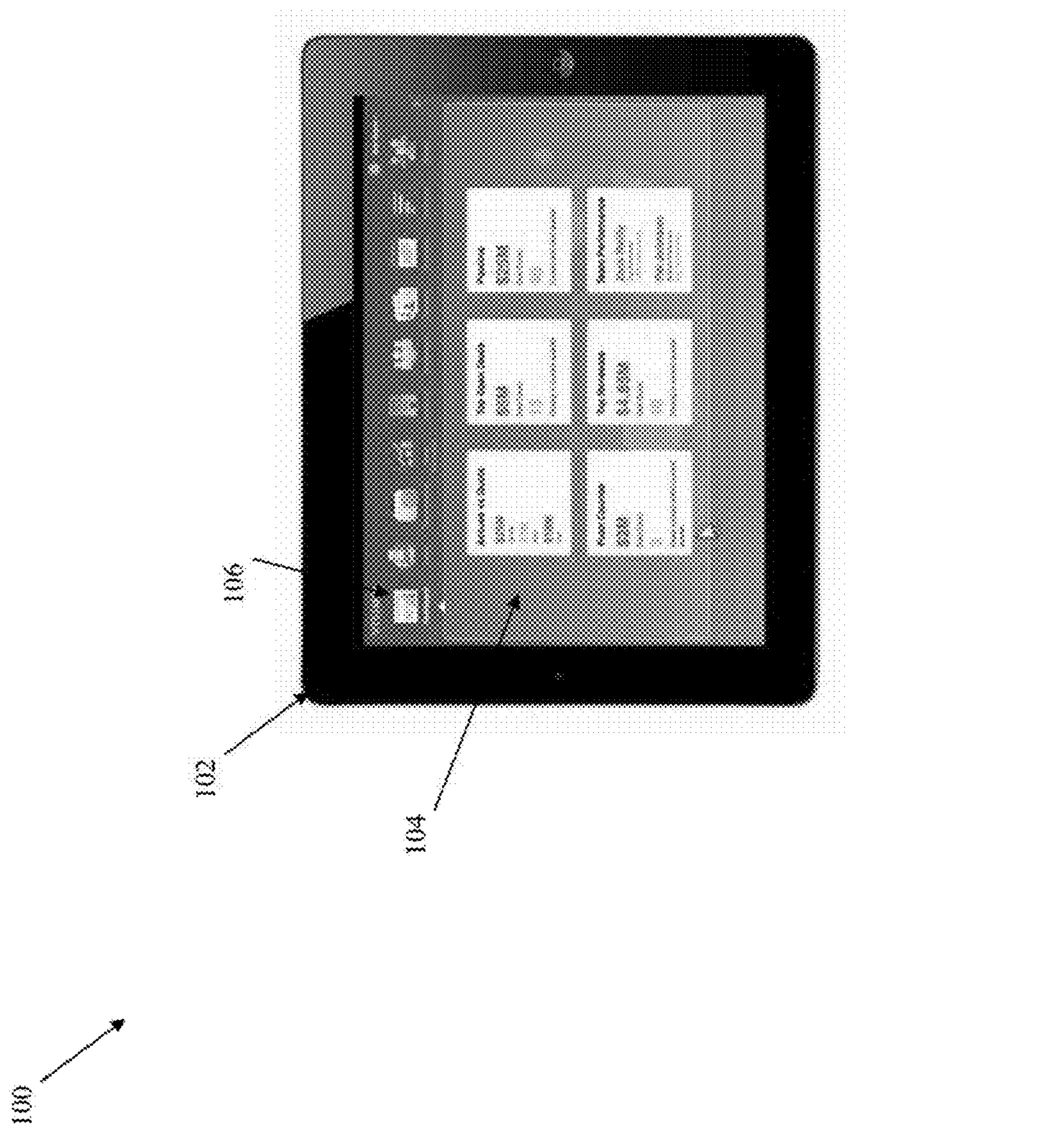
FIG. 1 illustrates an example user interface accessing the integrated enterprise platform, according to one or more embodiments.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of mobile applications that receive additional role and environment information. It is noted, however, that the invention is not limited in its scope to these types of applications and this set of additional information, and indeed, may be applied to other types of applications and information as well.

At the core of enterprise software solutions, is the need to ensure participation and engagement among employees of the enterprise (e.g., business, corporation, company, non-profit organization, etc.). Typically, however, enterprise software products are not necessarily designed to cope with changing technological realities that employees of the company are often faced with. For example, given the number of competing software products, enterprise software must be efficient and have the specific quality of presenting relevant content in a meaningful manner so as to maximize the user's interest and productivity. As described above, employees are more likely to use a product that presents all relevant information in an integrated manner, rather than one that forces employees to use multiple programs.

For example, when viewing data (e.g., sales figures, sales opportunities, etc.), users may be interested in viewing an analytical chart of the data that provides an overall summary of the data, rather than viewing the entire transactional dataset. Or, in another example, the user may decide to drill down on a desired data point based on the summary of the data. However, in reference to prior approaches, analytical data (e.g., summary information, analytical charts etc.) is viewed through a separate business intelligence program, while any changes to the underlying transactional data must typically be made on a separate program altogether. Thus, employees typically shuttle back and forth between two or more applications to meaningfully understand the data, and make any changes/additions to it. This proves to be inefficient and cumbersome, and decreases productivity of the employee.

Furthermore, in the age of mobile technology (e.g., tablets, smartphones, etc.), employees may prefer to view data across software platforms, rather than being forced to interact with one or more enterprise software programs through a traditional computer set-up (e.g., personal computer, laptop, etc.). The type of computing device being user to access the application (e.g., tablet, smartphone, laptop, etc.) may dictate the user's level of interaction with the data. For example, when the user is accessing the enterprise software application on a smartphone, the user may simply be interested in a high-level review of the data given the size restrictions of the smartphone, and may not choose to look at more detailed data reports.

Or, if the user is accessing the enterprise software application on a tablet, the user may be more inclined to drill down on one or more datasets to review the data more carefully. Or, in yet another example, the user may be most inclined to view detailed data reports when using the enterprise software application through a laptop or other personal computer device. Thus, the same enterprise software application must easily translate from providing a high-level review on a smartphone, but must also have the ability to drill down to provide a more detailed view if the user so chooses. Unfortunately, this is rarely the case in most enterprise software applications. Most enterprise software applications are designed for a particular platform in a manner that rarely translates to being used in other platforms. Thus, a more user-friendly and integrated platform for enterprise software is required to ensure participation of employees of a company.

To this end, an integrated enterprise platform is presented in which data is organized in a manner such that it can be presented in a layered-tier approach through the use of a "glance," "scan," and "commit" approach as will be described in further detail below. Rather than forcing enterprise users to shuttle back between multiple enterprise applications, the integrated enterprise platform seamlessly integrates aspects of the multiple enterprise applications and sequentially presents multiple depths of information pertaining to a desired dataset. The layered tier approach presents the user with layers of depth of a particular dataset such that the user only drills down to a detailed depth if he/she chooses to without unnecessarily being forced to. This design approach allows users to access only a desired depth of data, which may be especially relevant for users of non-traditional computing devices such as smartphones or tablets, for example.

FIG. 1 illustrates an exemplary embodiment of an enterprise software application that utilizes infolets to present data. "Infolets" refers to a data presentation format that provides the user with a summary view of one or more datasets. In other words, a user can advantageously utilize the infolets to gain an overview of the data without necessarily sorting through the underlying particulars of the data.

As shown in the illustrated embodiment, the enterprise software application can be used on a tablet device 102. Similarly, it may be accessed through a smartphone, a personal computer or any other computing device. The user interface 104, as shown in the illustrated embodiment, is designed to be user-friendly and presents one or more sets of data through the use of infolets. More details on infolets will be described below in relation to the rest of the diagrams. The user interface 104 also shows various icons 106 that may be selected by the user to drill down to a deeper level and view more information. As shown in FIG. 1, the design of the user interface is such that it easily translates to a touch-screen tablet, as well as a smartphone, and may just as easily be used through a conventional web-browser interface.

Figure 2:
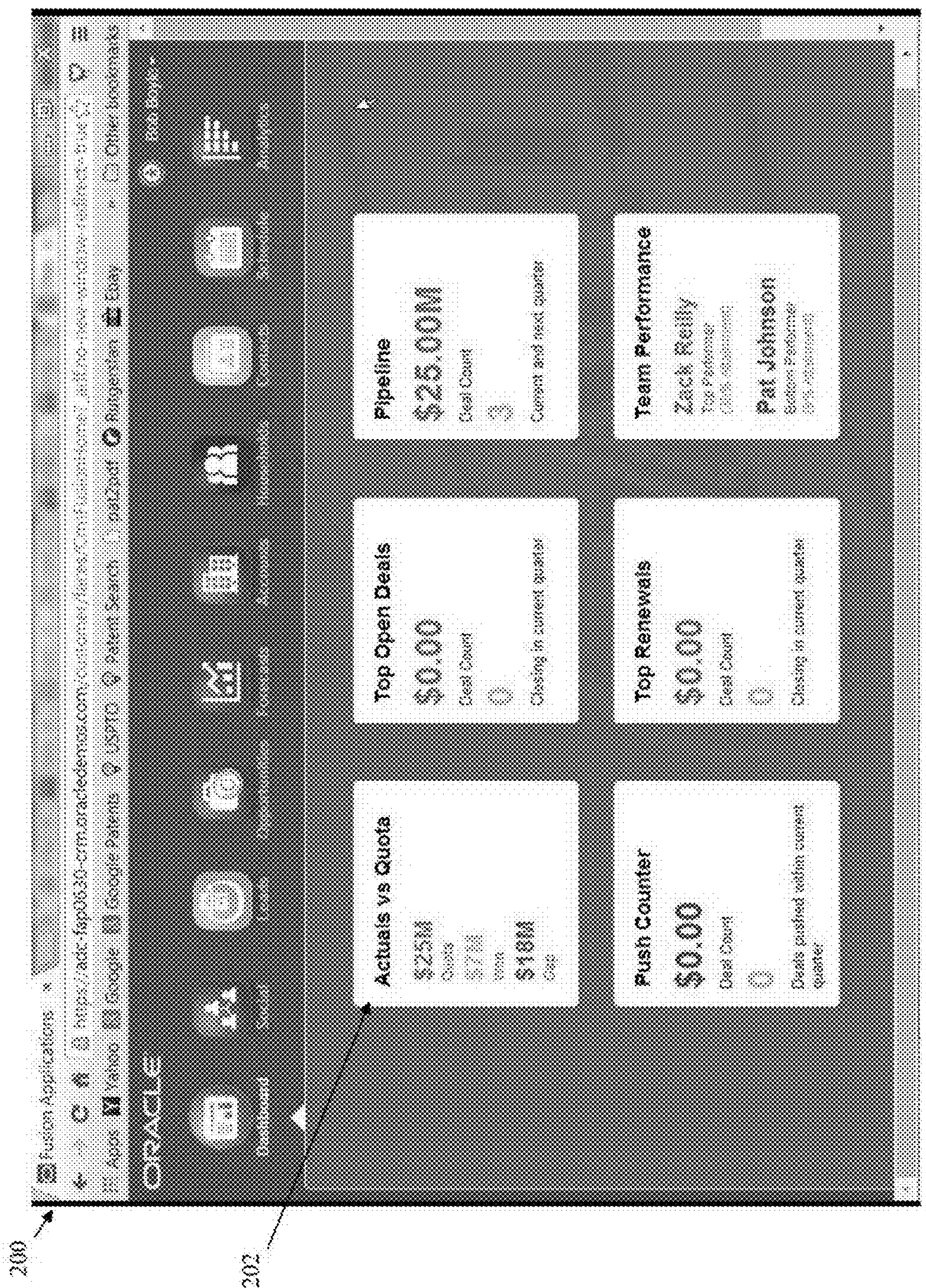
FIG. 2 illustrates an example user interface of a "Glance View" according to one or more embodiments.

Referring to FIG. 2, the user interface of the enterprise software application 104 will be described in further detail. In the illustrated embodiment, the user interface 104 presents information through the use of infolets 202. As used in the current application, the term "infolet" refers to a summary view snapshot of a desired dataset as mentioned above. FIG. 2 illustrates a user interface that includes six infolets 202. It should be appreciated, however, that one or more embodiments may be designed to include only one infolet, two infolets, ten infolets or any other number of infolets.

The embodiment of FIG. 2 provides the user with a "glance" view of the data. Each of the infolets may be customized or configured by the user in one or more embodiments. Alternatively, the datasets of the infolets may be presented based on a set of inferences made about the user, as will be described in further details below. The glance view shown in FIG. 2 provides a summary-level view for each of the infolets. Thus, the user can view a summary or analytics about a particular group of data, without going through the entire transactional data. This feature enables the user to save valuable time by offering a quick glance through possibly huge amounts of data, thus providing the user with necessary information, while not burdening the user with copious amount of underlying data.

The glance view shown in FIG. 2 may be especially popular when the user is on-the-go and is viewing the enterprise software application through a smartphone, for example. The infolets 202 provide a way for the user to easily look up a summary of a desired data group without having to sift through a large amount of data. However, if the user wants to study the data that is presented in the glance view, the enterprise software application allows the user to select a particular infolet of interest, and drill down to a "scan" view of the data. It should be appreciated that each of the infolet tiles is selectable by the user, such that an action associated with selecting a particular infolet tile (e.g., a touch screen gesture, a mouse click, etc.) opens up another user interface that is mapped to that particular infolet tile. More details on mapping will be provided further below.

Figure 3:
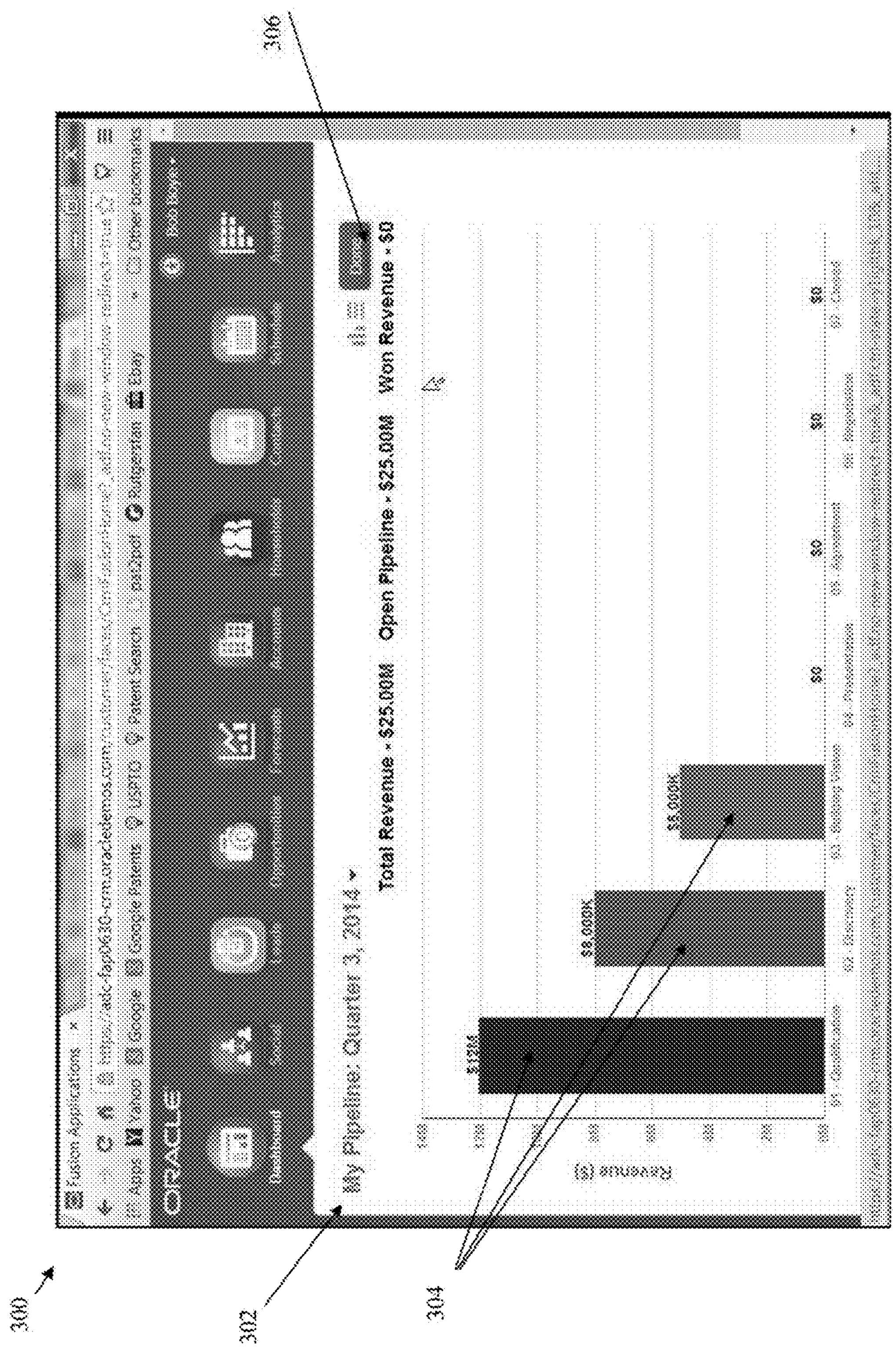
FIG. 3 illustrates an example user interface of a "Scan View" according to one or more embodiments.

Referring to FIG. 3, a scan view of the data 302 is illustrated. The scan view 302 provides the user with a more detailed view as compared to the glance view. For example, the user may have selected the infolet entitled "Pipeline," in the glance view shown in FIG. 2 to view more details on the $25,000 figure. When the particular infolet is selected (e.g., through a mouse click, through a touch screen gesture, etc.), the user is taken to the scan view 302. In one or more embodiments, the scan view may be a pop-up screen that is generated based on the selection of one or more infolet tiles in the glance view of FIG. 2. Other embodiments may populate the scan view 302 in the same window.

The scan view 302 provides more information on data that composes the $25000 revenue figure. As shown in FIG. 3, the scan view 302 offers a breakdown on the $25000 figure (e.g., 12000 on "qualification," $8000 on "discovery" and $5000 on "building vision.") It should be appreciated that the scan view, as shown in FIG. 3 provides analytical information, but at a deeper level than that displayed on the infolet tile of FIG. 2. As shown in the illustrated embodiment, the scan view 302 may depict analytical data visually through the user of graphs, charts, tables, pie charts, or any other visual or textual medium.

Here, the scan view 302 shows the breakdown of the total revenue number through the user of bar graphs 304. Thus, it can be appreciated that the scan view 302 provides a more detailed view of a particular infolet of interest as identified in FIG. 2, without overwhelming the user with too much data. The scan view 302 is a slightly more detailed layer as compared to the glance view 202 of FIG. 2. The user may actuate button 306 to be taken back to the glance view 202 of FIG. 2, or the user may drill down further into one or more figures/numbers to be taken to an even more detailed view of the data. In one or more embodiments, the figures (e.g., a bar of the bar graph, a section of a pie chart, etc.) or text itself may be selectable, such that a more detailed scan view is presented to the user. Here, for example, the user may select one of the bars 304 to be taken to a detailed scan view user interface.

Figure 4:
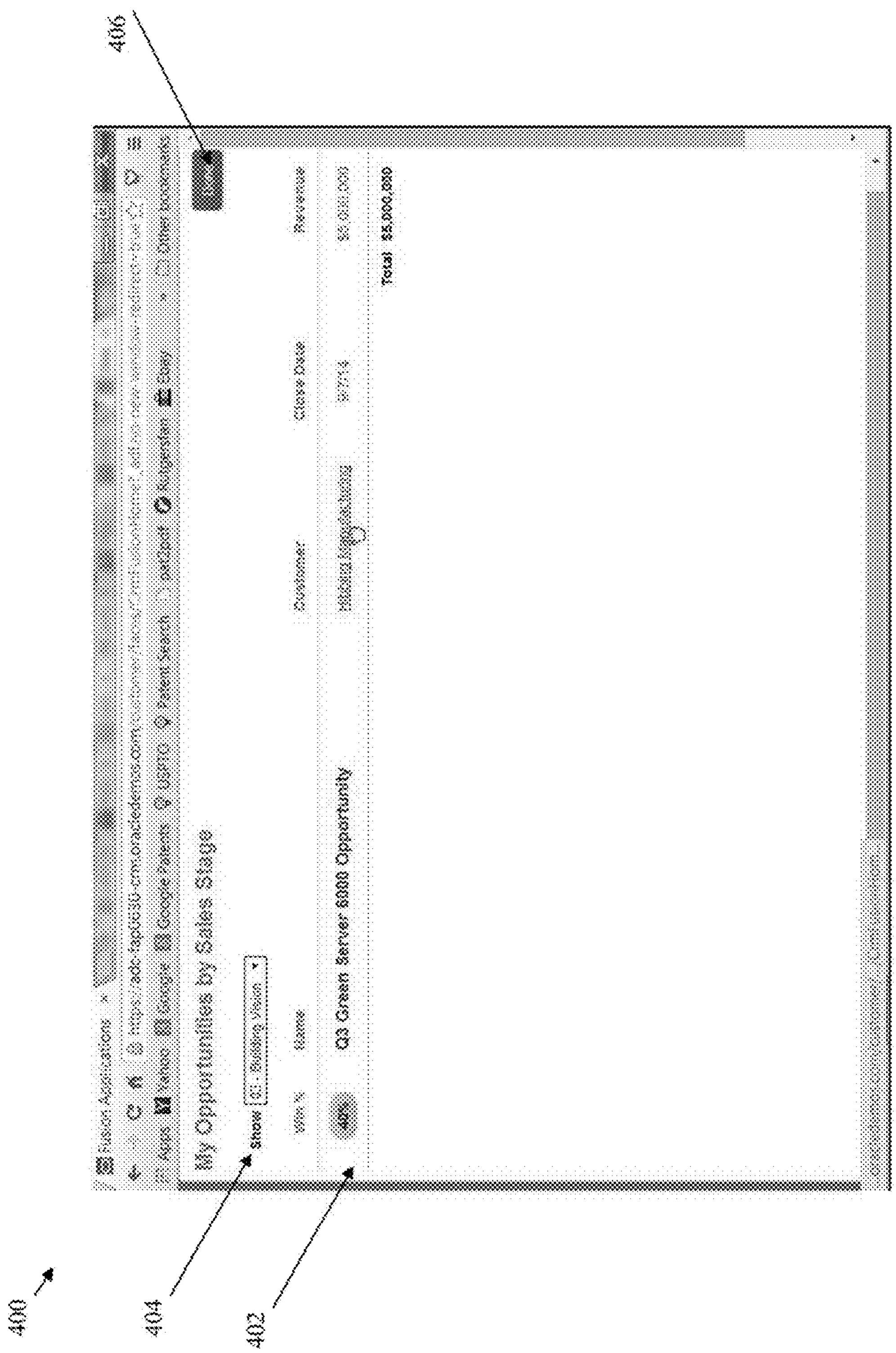
FIG. 4 illustrates an example user interface of a "Scan List View" according to one or more embodiments.

One or more embodiments of the enterprise software application may also include a list view or detailed scan view to provide yet another level of information to the user. Thus, the enterprise software application processes a large amount of underlying data related to a particular employee to present it in a granular fashion, such that the user starts out with a top-level summary view of the data, but has the option to drill down in order to interact with the data at multiple levels of granularity. Referring to FIG. 4, a detailed scan view 402 is presented. The user may have clicked on rightmost bar 304 of FIG. 3 to be taken into the detailed scan view 402, which provides further information on the data that makes up bar 304 ("$5000).

In the illustrated embodiment, the detailed scan view 402 shows the name of the opportunity, customer information, win % and other information corresponding to the selected bar 304 of FIG. 3. Although only one item appears on the list in the illustrated embodiment shown in FIG. 4, it should be appreciated that the data may be comprised on multiple opportunities and/or data points. The detailed scan view 402 provides a deeper level of information when compared to the interfaces shown in FIG. 2 and FIG. 3.

In one or more embodiments, the user may actuate the drop down control 404 to view a detailed scan view of one or more of the other bars 304 shown in FIG. 3. As shown in the FIG. 4, the drop-down control 404 shows "03 Building Vision" which corresponds to the third bar from the left from FIG. 3, but the user may easily view a more detailed view of any of the other bars 304 using control 404. Similar to above, the user may actuate button 406 to be taken back to the previous screen or to the glance view 202 of FIG. 2. Or, if the user wants to drill down further into one or more items on the list 402, the user may select a particular item on the list. In one or more embodiments, each item on the list (or a particular value on the row) may be selectable, such that a detailed transactional view is presented to the user. Here, for example, the user may select the only item shown in the detailed scan view 402 to be taken to a "commit" view user interface.

Figure 5:
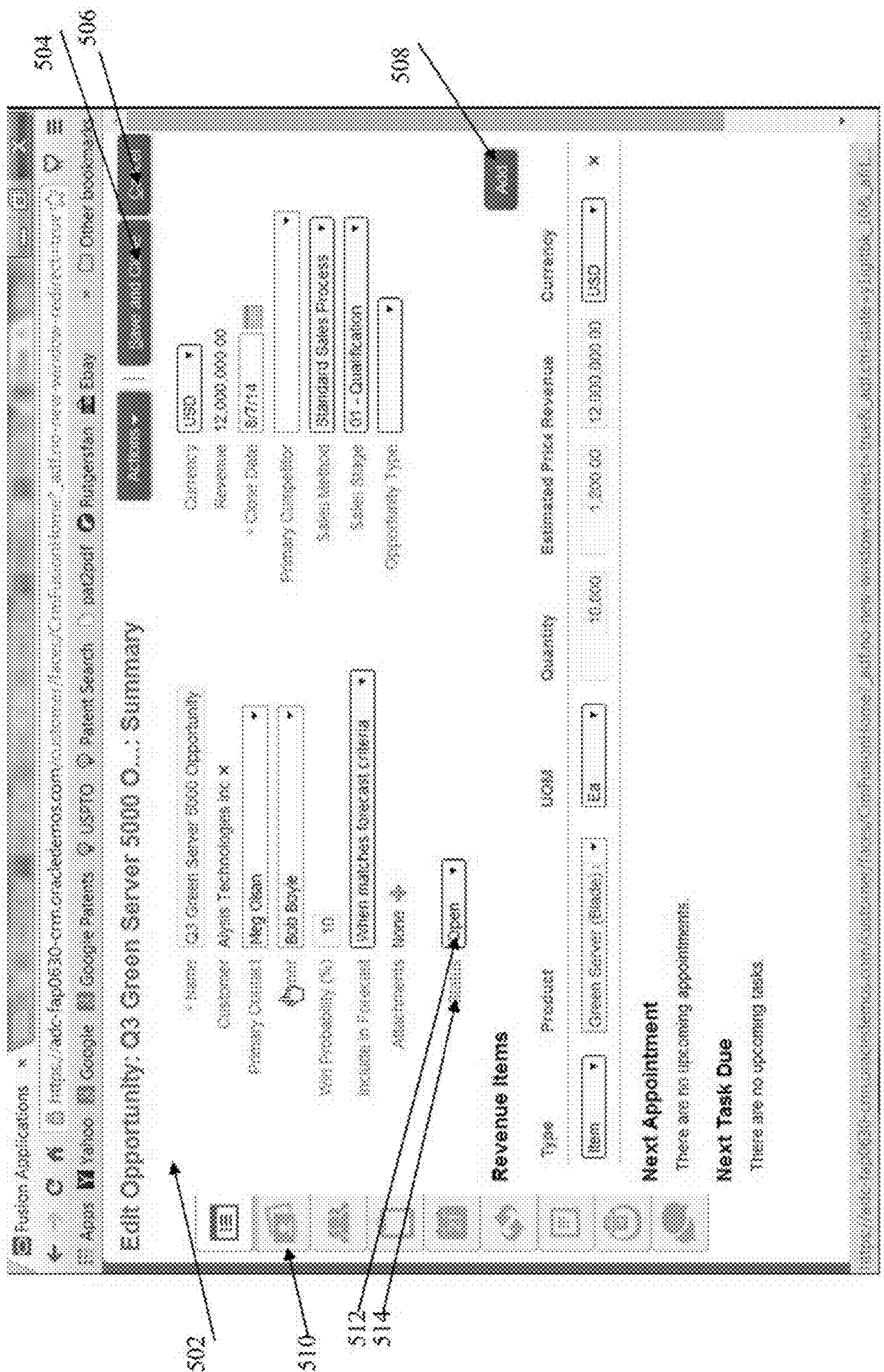
FIG. 5 illustrates an example user interface of a "Commit View" according to one or more embodiments.

Referring to FIG. 5, a user interface corresponding to the commit view is illustrated. As discussed above, the commit view interface is a transactional interface that provides the most detailed view of the data, such that the user can add/edit/delete and/or modify values of one or more tables. As shown in FIG. 5, the commit view 502 presents the underlying data in a report format such that the user can interact and manipulate the data using one or more controls. For example, the Commit view 502 allows the user to select values of one or more fields (e.g., name, opportunity, contact name, status, etc.), each of which is shown to have its own control in FIG. 5. In the illustrated embodiment, each field has controls that are selectable in order to enter desired values. It should be appreciated that although FIG. 5 represents the Commit view through a transactional report format, other formats (e.g., table, program code, etc.) may be similarly used.

The Commit view 502 provides the user the most granular level of interaction with the data. In contrast to the other three levels illustrated in FIGS. 2-4, the Commit view is mostly transactional rather than providing high level analytical data. Other embodiments, however, may be designed such that the Commit view also displays analytical data in addition to the transactional data.

In one or more embodiments the Commit view 502 may include one or more side tabs 510 such that the user may view and/or interact with other categories of data in the detailed transactional report. For example, one of the tabs may correspond to a Social Networking tab, corresponding to a table that contains information regarding social network data. Or, another tab may correspond to a database table corresponding to contacts associated with the particular opportunity that the user has zeroed in on. Or, in yet another example, another tab may correspond to a calendar that shows past, present and future appointments with personnel associated with the selected opportunity. It should be appreciated that the tabs may be configured to best suit the user's interests, and more specifically, the user's role within the company.

Thus, using the commit view 502, the user can interact with one or more database tables related to a selected opportunity/item of interest. As shown in FIG. 5, the user utilizes controls 512 to configure/modify/delete values for one or more fields 514. Similarly, all fields include corresponding controls to enable the user to configure values. Similar to above, the user may actuate button 504 to save any changes/configurations made at the commit view interface. The user may then be taken back to the infolet screen 202, in one or more embodiments. Or, the user may actuate button 506 to cancel any changes/configurations.

By creating multiple depth-levels of information that may be incrementally presented to the user, the enterprise software application gives users the flexibility to conveniently interact with the data based on their external circumstances (e.g., environment, device, etc.) and inclination (e.g., user wants a quick view, user wants to modify values of a report). Thus, the same application can be used by a first employer who uses a smartphone to quickly glance through a high-level summary of data provided at the glance view 202, and by a second employer who wishes to modify one or more values of the underlying transactional data. Additionally, the various granular levels are configurable, giving the user even more flexibility in the look and utility of the enterprise software application.

In order to provide both analytical and transactional information to the user through the Glance-Scan-Commit user interfaces discussed in relation to FIGS. 2-5, the enterprise software application leverages two different applications and integrates them seamlessly. To explain, analytical data (e.g., charts of the infolet tile in FIG. 2, bar graphs of FIG. 3) may be housed and/or accessed through an analytical application. One example of such a tool is Oracle Corporation's Business Intelligence (BI) tool, which supports a wide variety of business functions. There can be different types of BI applications used in the enterprise environment, such as sales, marketing, supply chain, financial, and human resource applications. It should be appreciated that other analytical tools may be similarly used. BI applications are commonly applied in performance analysis, ad hoc reporting, competitive analysis, and many other functions. BI is typically employed for analysis of underlying data, and proves highly effective to users for analyzing and visualizing large amounts of data. For ease of explanation, the following application will describe one or more embodiments using BI as an example analytical application.

On the other hand, transactional data may be housed and/or accessed through a separate application altogether. One example of such an application is a Oracle Corporation's Application Development Framework (ADF) tool which provides a commercial Java framework for creating enterprise applications and user interaction environments. Similar to above, it should be appreciated that the above two applications (i.e., BI and ADF) are used in the present context for illustrative purposes only, and one or more embodiments may utilize other applications in accordance with the concepts outlined herein.

With regards to one or more embodiments of the current invention, the enterprise software application may be developed using ADF but may strategically include elements of BI to provide the layered data functionality discussed above. Oracle ADF is based upon the model-view-controller architecture, which is known and documented. See, for example, "Oracle ADF 11g Primer; Introduction to the building blocks of a Fusion Web application" (An Oracle White Paper, April 2007), incorporated herein by reference.

The model-view-controller architecture isolates business logic (e.g., data) from user interface considerations, resulting in an application or user interaction environment where it is easier to modify either the visual appearance of a user interaction environment or the underlying business rules without affecting the other. In the model-view-controller architecture, the model represents the information (the data) of the application and the business rules used to manipulate that data, the view corresponds to the elements of the user interface such as text, check box items, and so forth, and the controller manages details involving the communication to the model of user actions such as keystrokes and mouse movements. Although Oracle ADF is provided as an example, the invention described herein may be utilized in other environments. However, for ease of description, some examples herein involve use of Oracle ADF.

Figure 6:
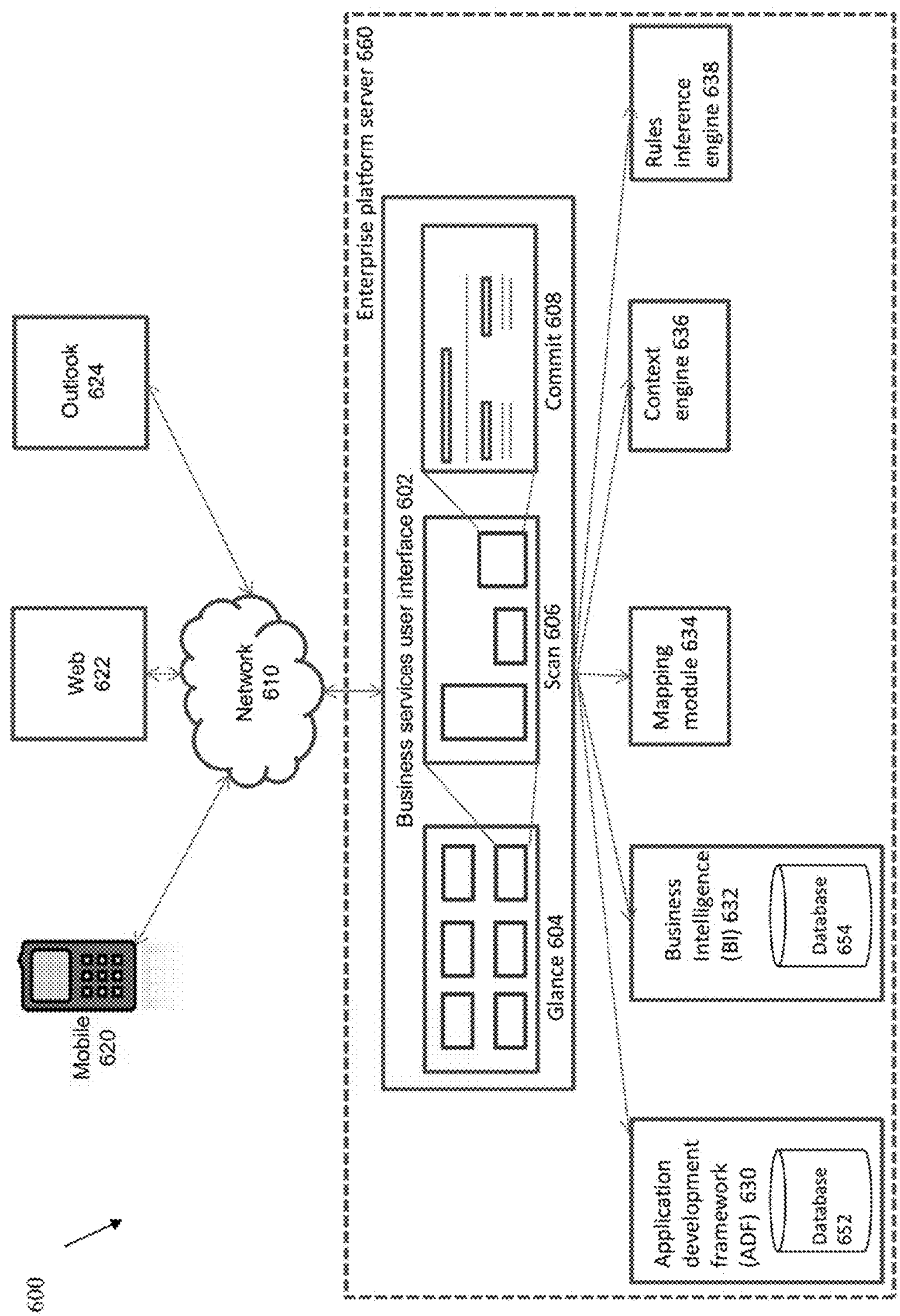
FIG. 6 illustrates a system architecture of the integrated enterprise application according to one or more embodiments.

More significant to embodiments of the current invention, both BI data and ADF are integrated into one application such that the user can advantageously visualize and interact with analytical data (through BI) and transactional data (through ADF). Referring now to FIG. 6, the overall system architecture of the enterprise software application will be described. The integrated software platform may be accessed by multiple users who can access and interact with the enterprise software application. In one or more embodiments, the enterprise software application may be provided to the one or more business accounts through a SaaS (Software as a service model). Or, in other embodiments, the enterprise software application may be provided as an installed software system.

More particularly, one or more users associated may access and interact with the integrated enterprise platform (system 600) over a network (e.g., WAN, LAN, etc.) through a mobile phone 620 (e.g., smartphone, etc.), a secure web browser 622, an Outlook® browser, etc. Or, in other embodiments, tablet devices may be similarly used to access and interact with the business platform. The tablet device may comprise any type of portable device, including for example, tablet computers, portable readers, PDAs, etc. The mobile telephone device may comprise any mobile device that can suitably access an application on application server, such as smartphones and programmable mobile handsets. It should be appreciated that the above three devices/browsers are mentioned for exemplary purposes only, and other devices/browsers etc. may be similarly used.

In one or more embodiments, users interact with the integrated enterprise platform through a user interface 602. As described previously, the integrated enterprise application allows users to view underlying business data at varying granularity levels such that the user may simply view analytical data, or may drill down to view and interact with transactional data that makes up the analytical data. To this end, the enterprise software application may include a glance user interface 604, a scan user interface 606, and a commit user interface 608. It should be appreciated that other embodiments may include fewer or greater levels of granularity, and the above series of Glance-Scan-Commit user interfaces are described herein for illustrative purposes only. Because the infolets represent the smallest "bite" of data, from which the user can drill down into greater depth levels, the infolet structure translates well between devices (e.g., laptop, smartphone, tablet, etc.) and it functions cross-platform, rather than being singularly suited for any particular device.

As shown in FIG. 6, the user interfaces 604-608 enable the user to drill down on a particular object of interest if needed, but mostly presenting top-level data information in a meaningful manner through the Glance interface 604. It should be appreciated that the user interfaces may require authentication information (e.g., a login/sign-in screen, a registration screen, etc.) from the user before granting access to the enterprise software platform. For example, a small business ABC may have a business account with the SaaS application. ABC may have 8 sales reps, 2 sales managers and a Vice President. All 11 employees may be able to access the SaaS application and the business account for ABC through their own individual logins. After the user has been authenticated, the user may be directed to the customer a corresponding business account. It should be appreciated the user interfaces may be customized for each user, based upon the role of the user within the company, the user's preferences, and context data collected about the user, as will be described in detail below.

The content presented in the user interfaces 604-608 correspond to data received from both BI 632 and ADF 630, each having a corresponding database structure 652 and 654. The databases serve as a repository for data, which data can be stored and accessed as a relational database, or as a file, or as a memory-resident data structure. The integrated enterprise platform seamlessly integrates data from both applications. For example, with reference to the Glance View, such as the one shown in FIG. 2, the "container" or structure for the infolets may be developed through ADF, while the actual analytical data may be active data retrieved from the BI application. Similarly, in the Scan View, the structure of the Scan View may be developed through ADF, but advantageously leverages analytical information from BI. Or, in other embodiments, a user interface may only employ data from one application. For example, typically, the Commit view 502 of FIG. 5 utilizes ADF to enable the user to interact with the underlying transactional data of any particular dataset.

In order to integrate both BI and ADF objects on one or more interfaces, the enterprise application server 660 also includes a mapping module 634 that defines a mapping schema of one or more ADF objects to one or more BI objects. In one or more embodiments, the enterprise application server 660 may also include a context engine 636 and a rules inference engine 638 that, together determine what content to present to the user based on a set of context data collected about the user. It should be appreciated that some embodiments of the system may not include the context engine and the rules inference engine, such that the entire system, and what to present to a particular user is pre-coded rather than predicted by the system. Other embodiments may take advantage of the context engine and the rules inference engine to specifically provide the user with information that is most relevant to the user, even if the user specifically did not define the data objects that are of most interest to the user. More details on the context engine 636 and the rules inference engine 638 will be discussed further below.

Figure 7:
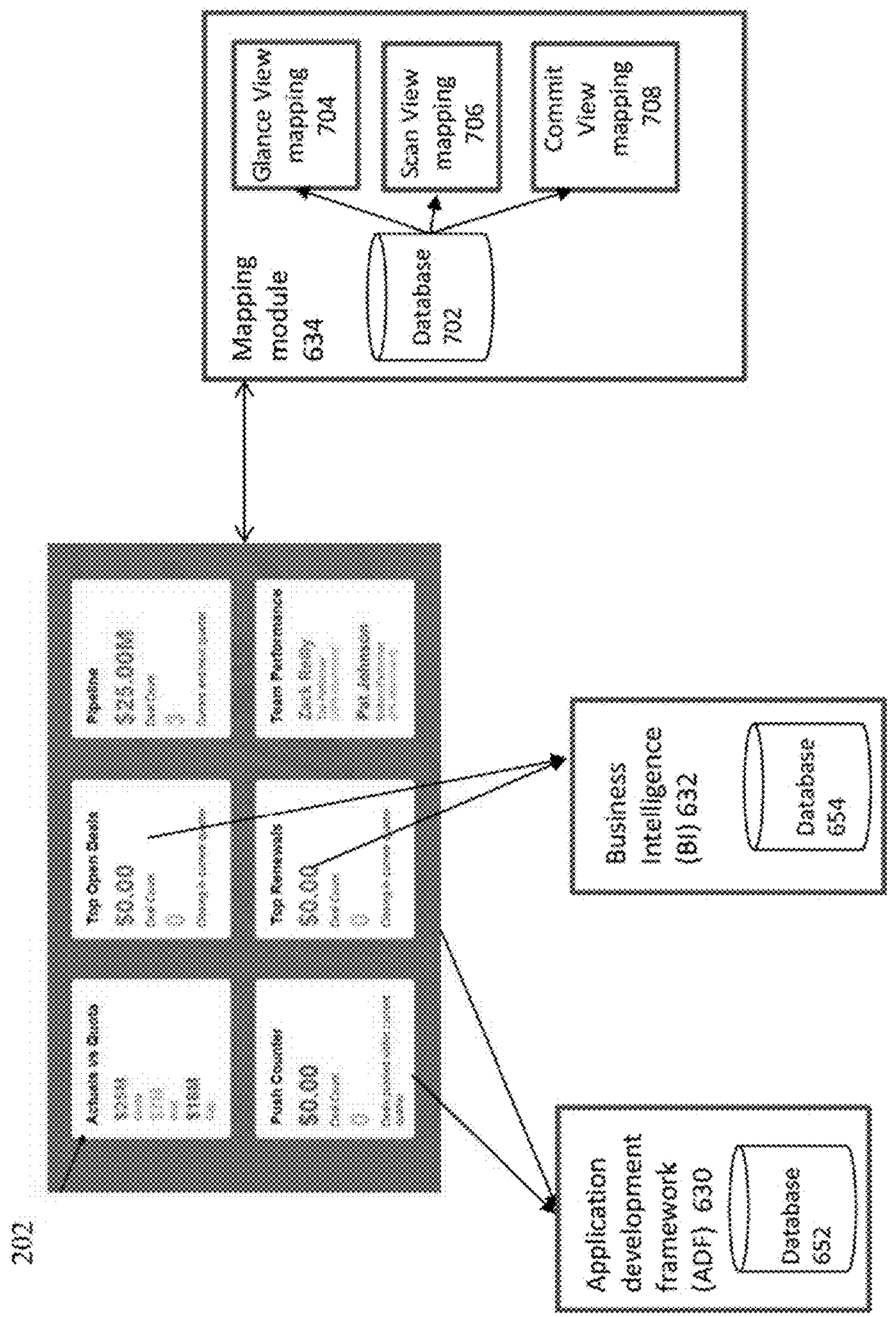
FIG. 7 illustrates data retrieved from an ADF application and a BI application according to one or more embodiments.

As discussed in some length above, the Glance-Scan-Commit user interfaces are formed by seamlessly integrating objects from both ADF and BI to provide a tiered presentation of the underlying business data. Thus, users can advantageously utilize one or more objects from an existing BI stack to provide analytical information, while also maintaining the infolet structure provided through ADF. More particularly, referring to FIG. 7, with reference to the Glance user interface 202, the container of the infolet itself corresponds to an ADF structure/object.

Similarly, the format/structure of the performance tiles also corresponds to ADF. However, the content that is populated within the structure/object comes from BI. Here, for example, the performance tiles are populated with various BI objects (e.g., top open deals, actual vs. quota, pipeline, etc.) that provide analytical information about the data. For example, the content represented in the performance tile "Actual vs. Quota" (top left) may come from a first BI chart, whereas the performance tile "Pipeline" (top right) may come from a second BI chart. It should be appreciated that the content of the various performance tiles may be customized for each user through the BI dashboard.

Similarly, with respect to the Scan view 302, the container of the Scan view may correspond to an ADF object, whereas the analytical chart (e.g., the bar graph of FIG. 3) may correspond to a BI object. Or, in another embodiment, the data within the ADF container in the Scan view may come from an ADF data object. Other user interface screens, like the Commit view 502 may correspond to only ADF, for example. Thus, the enterprise software application advantageously integrates elements of both BI and ADF into one platform that meaningfully presents information from both applications.

In order to merge elements from both applications, the mapping module 634 comprises a database 702 to store mapping information such that the system knows what BI report is linked to which ADF container, etc. For example, when the user selects a particular infolet, the system refers to the mapping module 634 to pull up information about a corresponding BI report to populate in response to the user's selection. Or, in another example, when the user first logs in, and is authorized to view the set of infolets, the system may refer to the mapping module 634 to present information from the corresponding BI reports configured for the displayed ADF containers of the Glance View for example. It should be appreciated that the system provides active data linked from the BI report, rather than static data. Thus, the system refers to the mapping module to pull up the right data reports from BI, for example (in the case of the Glance and Scan views), and populates them accordingly in the designated ADF containers.

In one or more embodiments, the mapping module may utilize 1:1 mapping such that each ADF container is linked to a corresponding ADF or BI database object. Other mapping techniques may be similarly used to link data from the different applications to each other. It should be appreciated that mapping is performed to display the right reports on each of the views (e.g., Glance View, Scan View, Commit View, etc.), and is also performed to pull up data such that a next display screen may be displayed. For example, when the user clicks on a particular ADF container of the Glance View, a corresponding BI/ADF report must be identified and displayed accordingly in the Scan View.

Or, in another example, when the user clicks on a particular object in the Scan View, the system is mapped such that the system raises an ADF contextual event based on the user's selection of a particular column of the Scan View and displays a corresponding ADF report. The mapping module 634 oversees mapping for the Glance View mapping 704, Scan View mapping 706 and Commit View mapping 708. In one or more embodiments, mapping information for all the views may be stored in the same database 702. In other embodiments, mapping information for each of the views may be stored in a dedicated database, or database instance.

Figure 8:
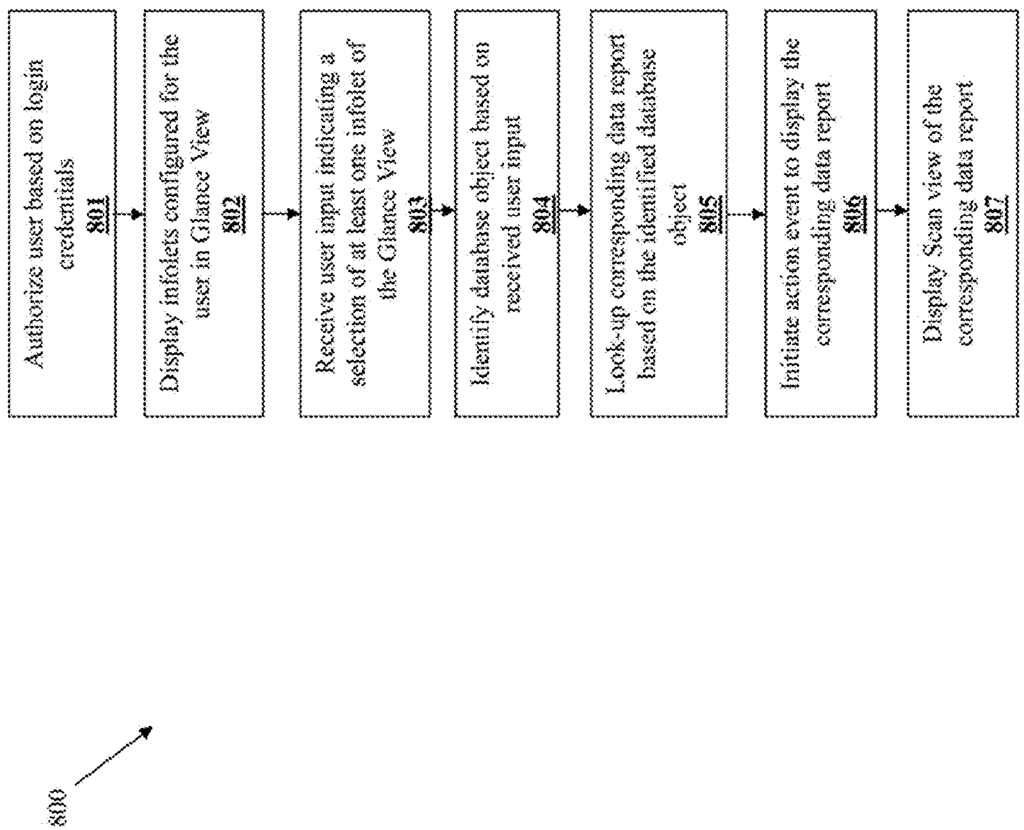
FIG. 8 illustrates a flowchart of actions taken to display the Scan View in response to a selected portion of the Glance View according to one or more embodiments.

Referring now to FIG. 8, an example process flow 800 for displaying data from the one or more application is illustrated. At 801, the system authorizes a particular user based on credentials. The system may have a login process in some embodiments or any authentication process to identify the user. As described above, the infolets/various views of reports are configured individually for various users such that the infolets populate different data from different reports based on the configuration. The infolets may be configured based on a user's role within the enterprise, customized needs set by the individual user or other such criteria. In other embodiments, the infolets may be configured at design-time (or later, by the individual user) to present particular data reports to users based on their role, experience, background, etc.

At 802, based on the authentication, the system displays the infolets configured for the user in the Glance view. In one or more embodiments, the system may employ the mapping module 634 to determine the right BI report to display in the ADF containers of the Glance View. For example, assuming there are six performance tiles in the Glance View, the mapping module may refer to the mapping module 634 to populate each of the performance tiles with the right BI summary report.

At 803, the system may receive user input indicating selection of one of the six performance tiles of the Glance View. It should be appreciated that although this process flow discusses mapping in the context of the Glance View, similar mapping is employed to go from the Scan View to the Commit View, or the Scan View to a more detailed Scan View, as described at length above.

At 804, the system identifies a database object based on the user's input. For example, the system may identify the particular ADF container holding a particular BI report. At 805, the system may look-up a corresponding data report based on the identified database object. Continuing with the above example, the system, having identified the selected ADF container holding the particular BI report, looks up a corresponding BI/ADF report to generate in response to the selection.

At 806, an action event may be initiated to display the corresponding Scan view based on the user's selection. The system may pull up the ADF containers for the Scan view. The system may also pull up another corresponding BI (or ADF) report to be displayed in the Scan view. For example, the selected infolet tile of the Glance View may refer to "September 2014 Sales," and the corresponding BI report to display in the Scan View may be a detailed list of all the Sales performed during that September. Thus, the two reports are successfully linked in the mapping module 634 such that the system knows what to present when a particular object is selected by the user. At 807, the Scan view holding the right BI reports is displayed to the user.

In order to give users the ability to integrate reports from BI and ADF, the infolets, such as the one shown in FIG. 2, are configurable such that BI reports can be meaningfully linked to the desired ADF transactional reports. This, in turn empowers users to utilize infolets in a manner that is most relevant to them. For example, a sales representative may configure an infolet tile of FIG. 2 such that the glance view provides a BI summary of overall sales figures for the quarter and link it a detailed report generated in ADF such that the sales representative can conveniently drill down into the ADF transaction layer as needed. In another example, a manager may configure an infolet tile such that the glance view provides a BI summary of sales rep performance for the quarter and link it to a performance review report generated in ADF such that the scan and commit view reflect data from the performance review report from ADF. This configurability aspect of the infolets gives users the ability to tailor the infolet presentation structure based on the user's individual needs.

Figure 9A:
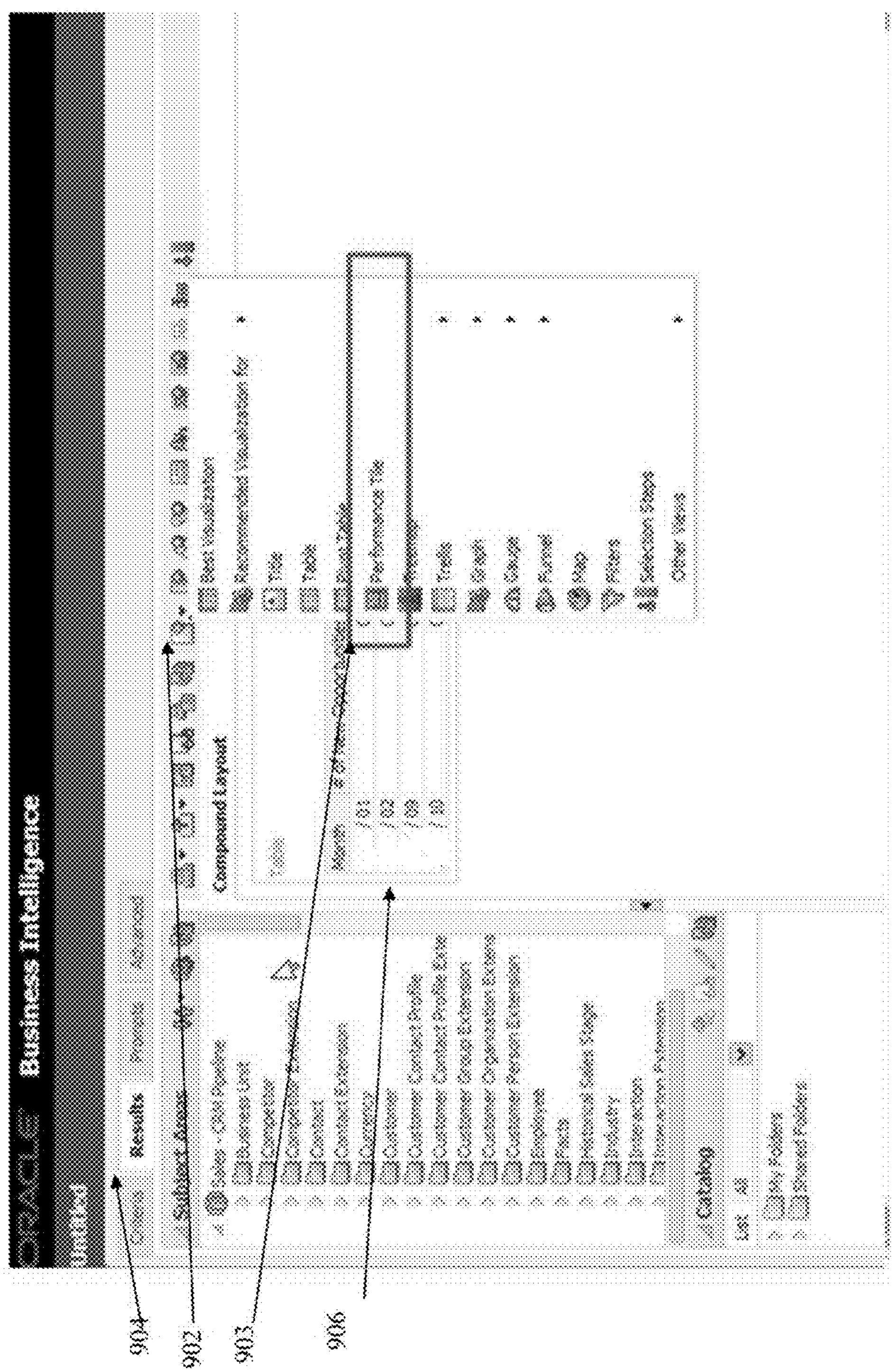
FIGS. 9*a*-9*c* illustrate a set of example user interfaces to configure the integrated enterprise application according to one or more embodiments.
Figure 9B:
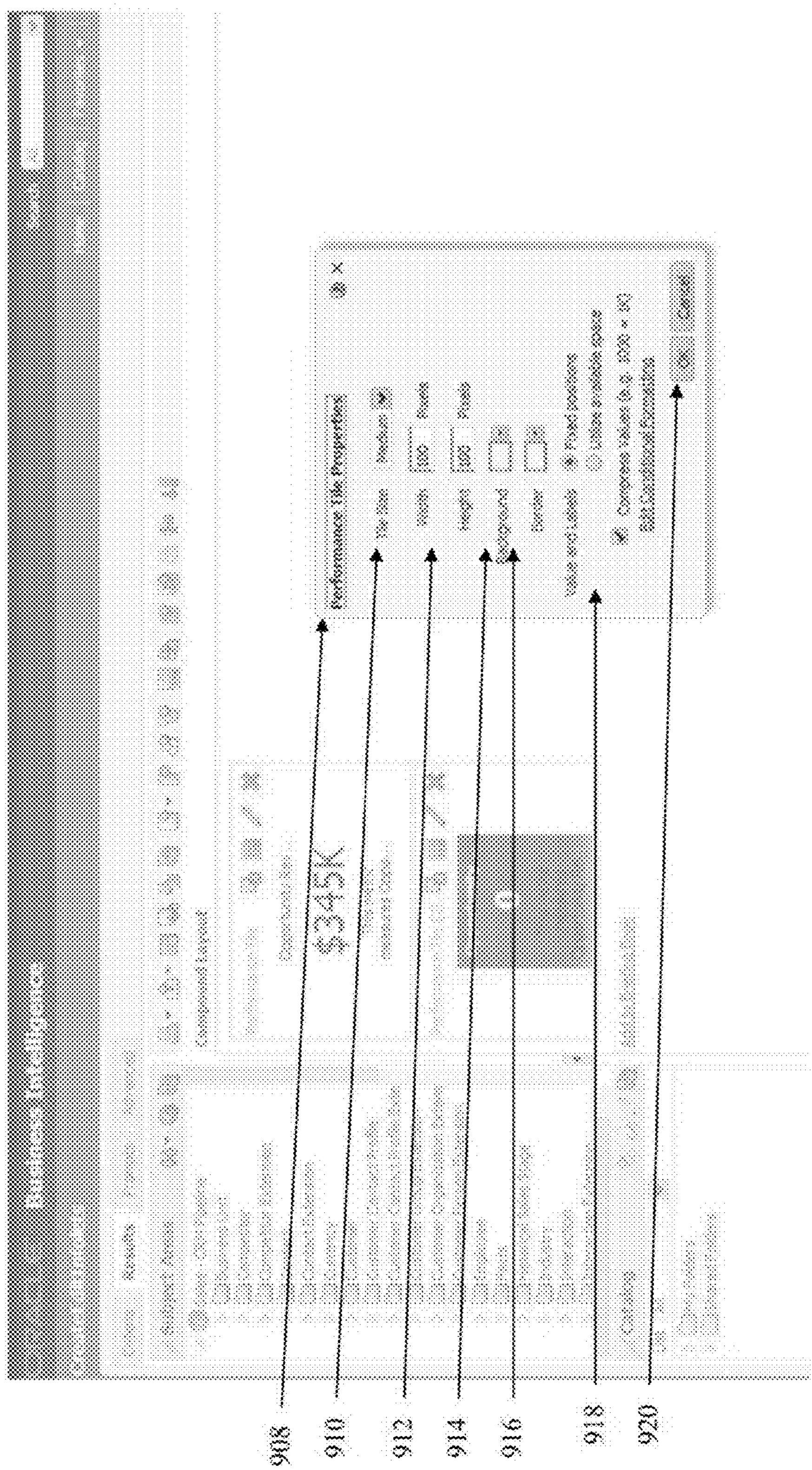
Figure 9C:
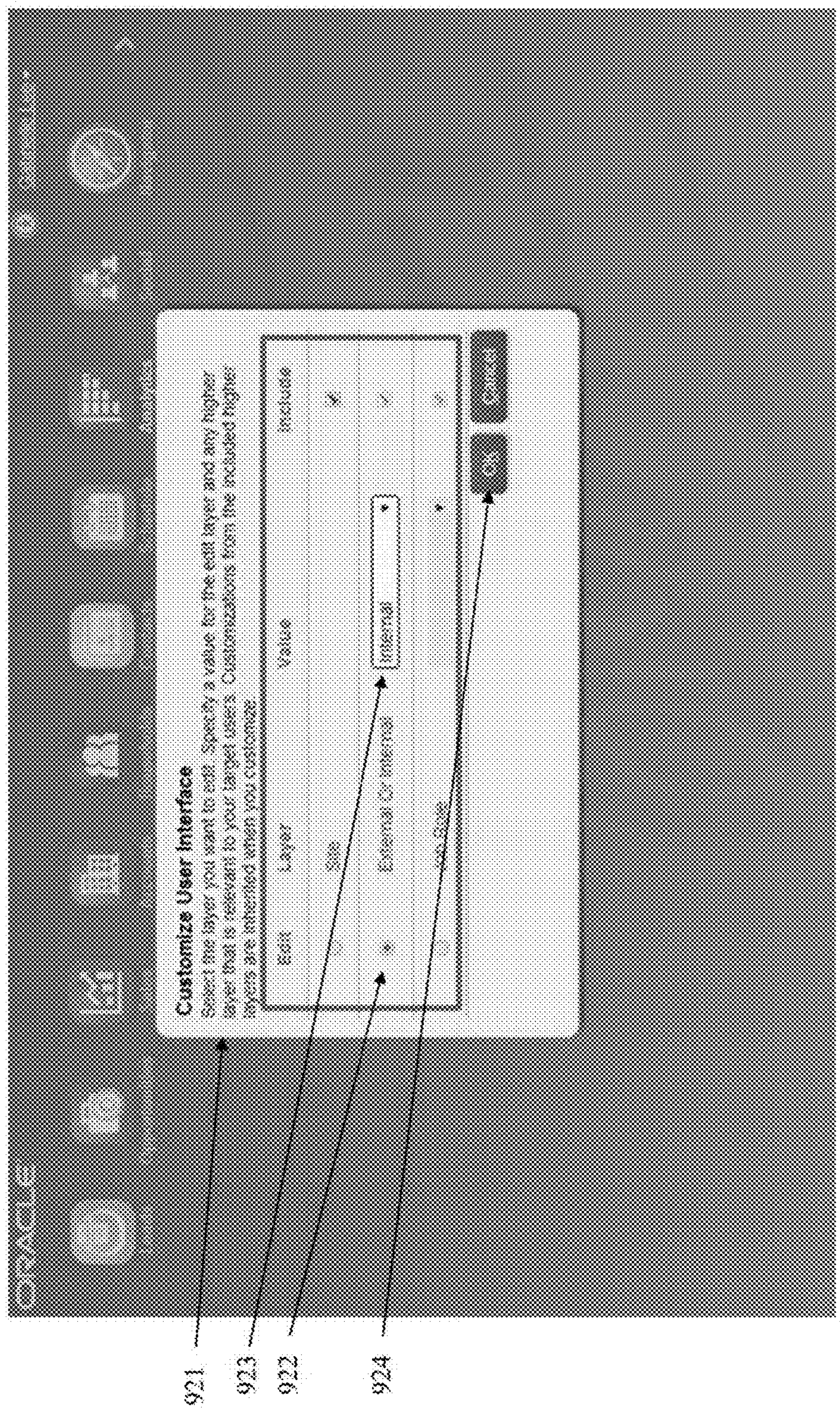

FIGS. 9*a*-9*c* illustrate a series of example user interfaces that help a user configured the performance tiles of the Glance View, such as the one illustrated in FIG. 2. As shown in FIG. 9*a*, the BI application has been opened. In other embodiments, not specific to ADF or BI, other applications may be used to configure the performance tiles. As shown in the example user interface, the BI application presents various options for organization and presentation of data.

As shown in FIG. 9*a*, the user interface populates a number of tabs 904 that present users with a number of options. In the current example, the "results" tabs has been opened. For example, the user interface provides options for one or more "Subject Areas," or categories with which to organize BI reports. One of the reports has been selected by the user, as evidenced by the table 906 populated on the user interface. In order to populate this data (or the analytics associated with this data) as a performance tile similar to the tiles of FIG. 2, the user may actuate a drop-down menu such as 902. The drop down menu 902 provides several options for visualization of the data. For example, the data may be visualized in a table format, a graph format, a map format, etc. (referring to other options of the drop down menu 902). To visualize the report as a performance tile, the user may actuate the clickable control 903, indicating to the system that the user wants to configure the data as a performance tile.

Referring now to FIG. 9*b*, another user interface is presented showing various options available to the user in configuring the performance tile (such as the one selected in FIG. 9*a*). As shown in FIG. 9*b*, a pop-up window "Performance tile properties" 908 has been populated. The performance tile properties pop-up window allows the user to select one or more properties with which to configure the performance tile. The user may select one or more controls for the various properties to select a desired property. In the example embodiment, drop-down menus, and selection buttons are presented, but it should be appreciated that any similar user-interface controls may be similarly used.

The user may actuate controls to select a tile size 908. For example, one or more embodiments may display a high number of infolets (e.g., 10), so the tile size may be reduced such that all the tiles may be viewed simultaneously. The user may also alter the height and width of the tiles using controls 910 and 912. In one or more embodiments, the user may select a background and/or border of each performance tiles using controls 914 and 916 respectively. The user may further be able to configure a position of the performance tile on the user interface using selection buttons (e.g., 918). In one embodiment, the user may select performance tiles to be displayed in fixed positions. Or, in another embodiment, the user may configure the system such that performance tiles utilize available space. Once the user has configured one or more configurability options, the user may actuate the "OK" button 920 to save the configurability options, and be taken to another screen, or go back to a previous screen.

Referring to FIG. 9*c*, in one or more embodiments, the user may be able to configure other values related to layers of data through a pop-up window 921. The pop-up window shows multiple layers of organization within the company. Performance tiles may be configured based on job role, or may be restricted based on internal or external users, or may be open to all users of the site. In the illustrated embodiment, the "edit" control has been actuated for Internal or External layer 922. The user may use the drop-down menu 923 to select either the Internal or External option. Similarly, other layers may be similarly edited. Once the user has configured the various levels, the "OK" button 924 may be actuated to save the changes and/or be taken to another screen.

Figure 10A:
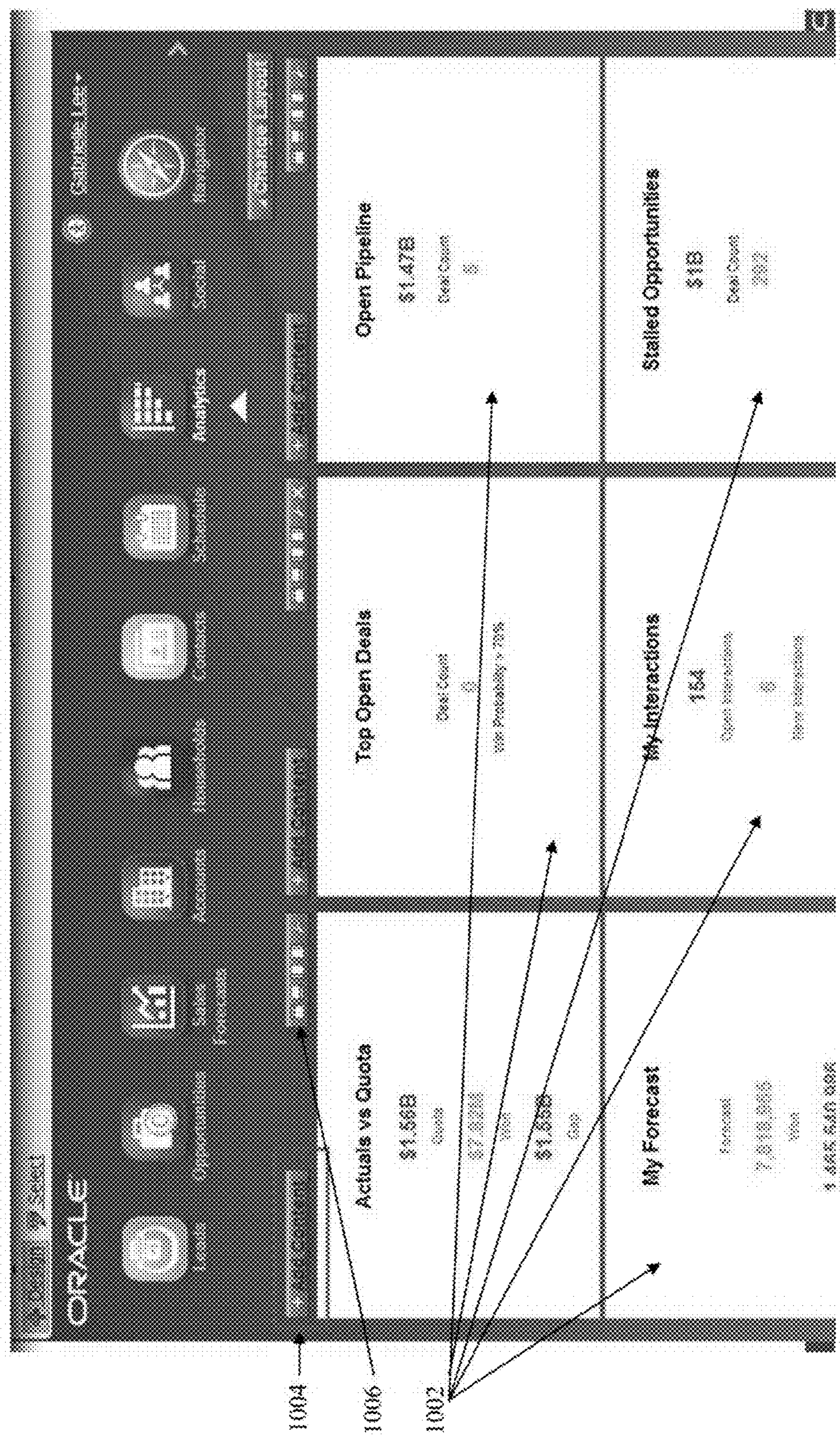
FIGS. 10*a*-10*b* illustrate a set of example user interfaces to configure an infolet with a desired report according to one or more embodiments.
Figure 10B:
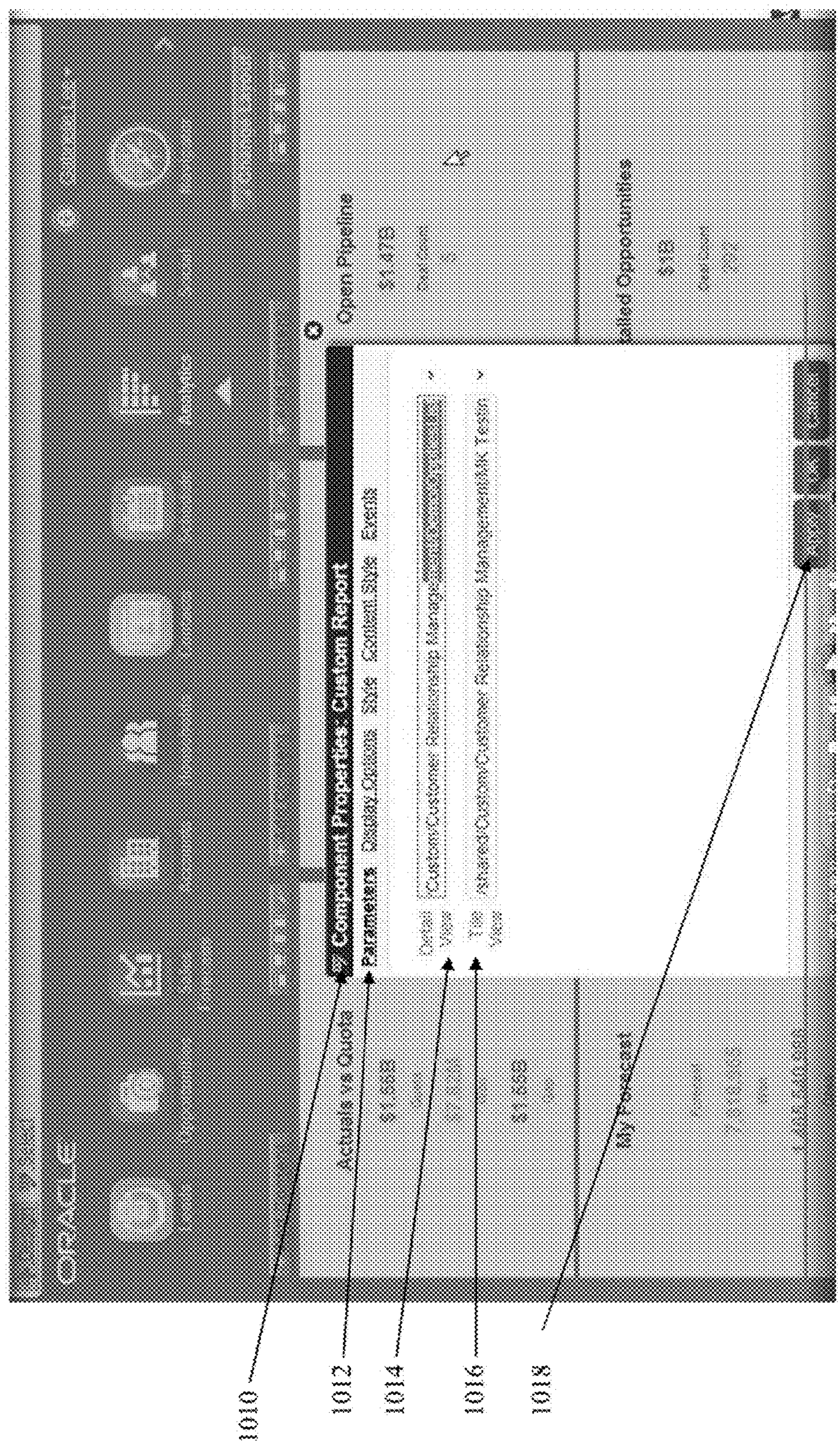

FIGS. 10*a* and 10*b* illustrate example user interfaces to be used to configure the performance tiles with desired BI or ADF reports. FIG. 10*a* illustrates an example user interface that the user may use to select one or more reports to display. In the illustrated embodiment, six infolet tiles 1002 are displayed. It should be appreciated that other embodiments may similarly utilize fewer or larger number of infolet tiles. Each of the infolet tiles may be configured through the "add content" 1004 control and the panel controls 1006 shown in FIG. 10*a*. The user may select any of the panel controls 1006 to alter an appearance, or data displayed at any given infolet tile 1002. For example, the panel controls 1006 may be utilized to alter the font of the text in relation to the summary data. Other such parameters may be similarly defined using controls 1006.

In order to add a particular report that the infolet tile should display, the user may actuate the "add content" 1004 control to add a particular BI or ADF report. When the user actuates 1004, the user may be taken to an "add content" pop-up window, such as the one illustrated in example embodiment of FIG. 10*b*.

Referring now to FIG. 10*b*, the user is presented with the pop-up window 1010 that allows the user to set one or more parameters of the BI and ADF reports. In one or more embodiments the pop-up window 1010 may comprise a panel of controls 1012 that allows the user to configure various parameters, display options, style content style and events. Other options may also be presented. In the illustrated embodiment, the "parameters" option has been darkened; this indicates that the user has selected the parameters option. The parameters tab allows the user to select one or more reports of interest based on which the infolet tiles of the Glance view are configured.

To select the BI report that is to be linked to the detailed view (e.g., scan view when a particular infolet is selected), the user selects the desired report through a drop-down menu control 1014. Similarly, to select the BI report linked to the infolet tile itself (e.g., BI summary view), the user selects the desired report through another drop-down menu control 1016. Using these controls, the user is empowered to not only control the look and feel of the infolets, and the corresponding detailed views, but also the data presented to the user. For example, a BI report corresponding to analytics for "Sales Figures 2014" may be linked to the tile view such that the Glance view provides a snapshot of sales figures for the entire year, but when that particular infolet tile is selected, the user is taken to another BI report that has a detailed list on the Sales numbers for the whole year (e.g., monthly sales, sales categories, etc.).

Once the user has configured the desired reports, the user may actuate the "Apply" button 1018 to be taken back to the infolet tiles screen, or any other screen. Thus, the user can leverage the infolet format such that data most relevant to the user is presented. It should be appreciated that the reports may be created on BI or ADF, and the active data from those reports are thus linked into the infolets.

Referring now to FIGS. 11*a*-11*e*, an example series of user interfaces are illustrated that can be used to configure ADF detailed reports based on a selection of a particular object in the list view. In particular, if the user selects a particular data object from the Scan view (e.g., list view similar to one illustrated in FIG. 4), the user is taken to a detailed active ADF report such that the user can automatically enter in information into the ADF report. Thus, similar to the above set of figures that illustrate how a user may configure reports such that the user is taken to the right BI report, the user can similarly configure the right ADF report (i.e., Commit View) to be taken to if a particular data item of the Scan list view (or other Scan view) is selected. Since the Commit View is typically an ADF report, this configurability may be achieved through a contextual event action such that the system performs an action event when a particular column of the data report is selected, as will be described in further detail below.

Contextual events raise an action when a particular column of a report is selected. To explain, consider a task flow with multiple page fragments that contain various values that could be used as input. In one or more embodiments, rather than using output parameters for each and every page fragment, one can define a contextual event that will be raised when the fragment is selected. It should be appreciated that other embodiments may use other ways of linking reports as well, and the following discussion only represents an example embodiment.

Referring back to the contextual event, the page fragment that requires the information can then subscribed to various events and receive information through the event. Contextual events may be configured for the page fragment that will raise the event. In order to associate the event with the page fragment, an event map may also be created (e.g., mapping module 634). A contextual event may be raised for an action binding, a method action binding a value attribute binding, a range binding (table tree, or list binding, etc.). For example, a contextual event from an ADF may be raised by clicking a button or selecting from a menu. It should be appreciated that when a particular page fragment is selected, the name of the column is also passed as payload. On the same page, another page fragment may subscribe to and consume the event and may display the desired ADF report based on the payload information passed with the contextual event Referring first to FIG. 11*a*, an example user interface illustrating a BI report (akin to one that may be presented in a Scan list view) is illustrated. The results tab 1102 has been opened showing options for various BI reports, as discussed above. In the illustrated embodiment, a particular BI report 1104 has been opened. The BI report shows a list of opportunities and sales corresponding to one or more rows of the BI report.

Figure 11A:
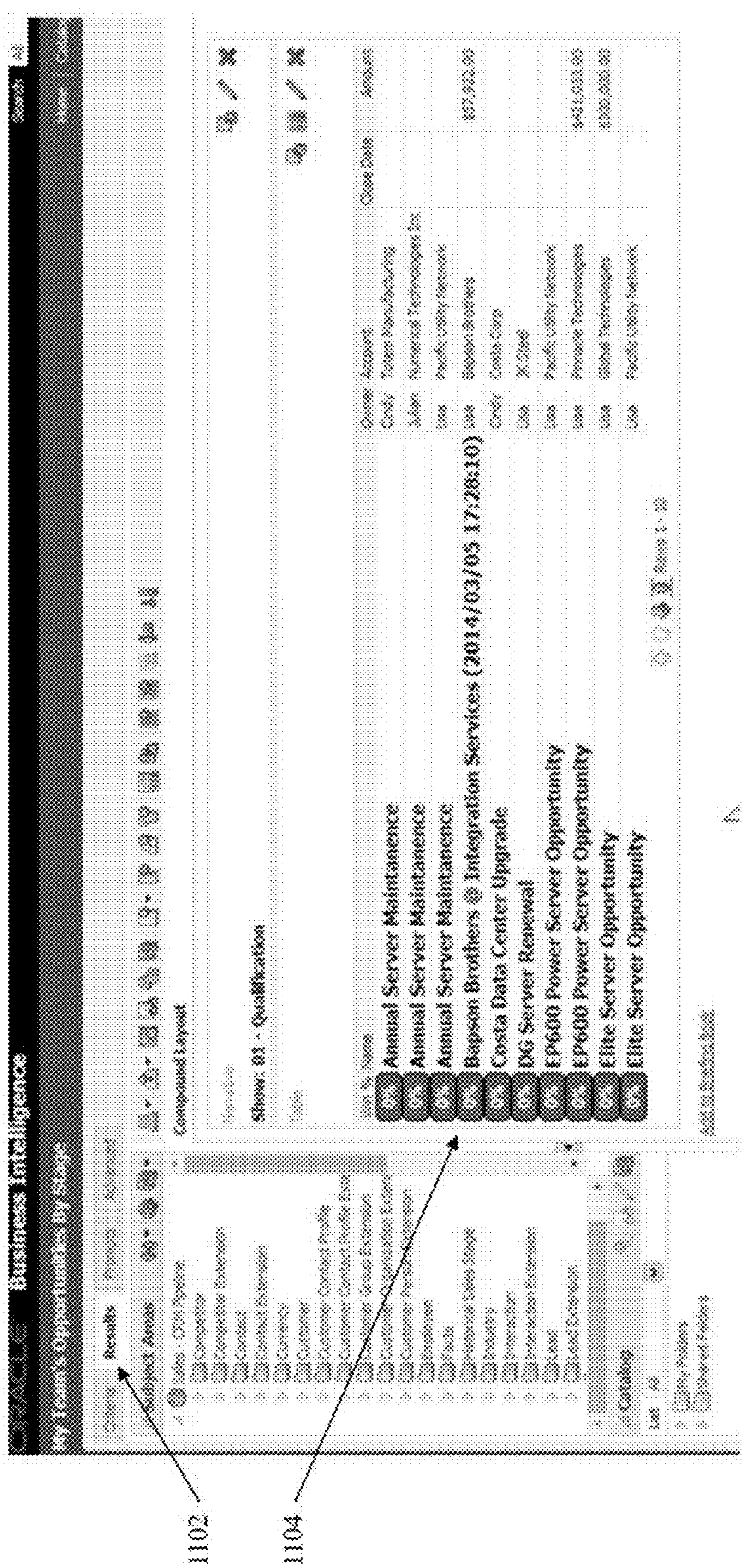
FIGS. 11*a*-11*e* illustrate a set of example user interfaces to configure an ADF contextual event to flow between the Scan View to the Commit View according to one or more embodiments.
Figure 11B:
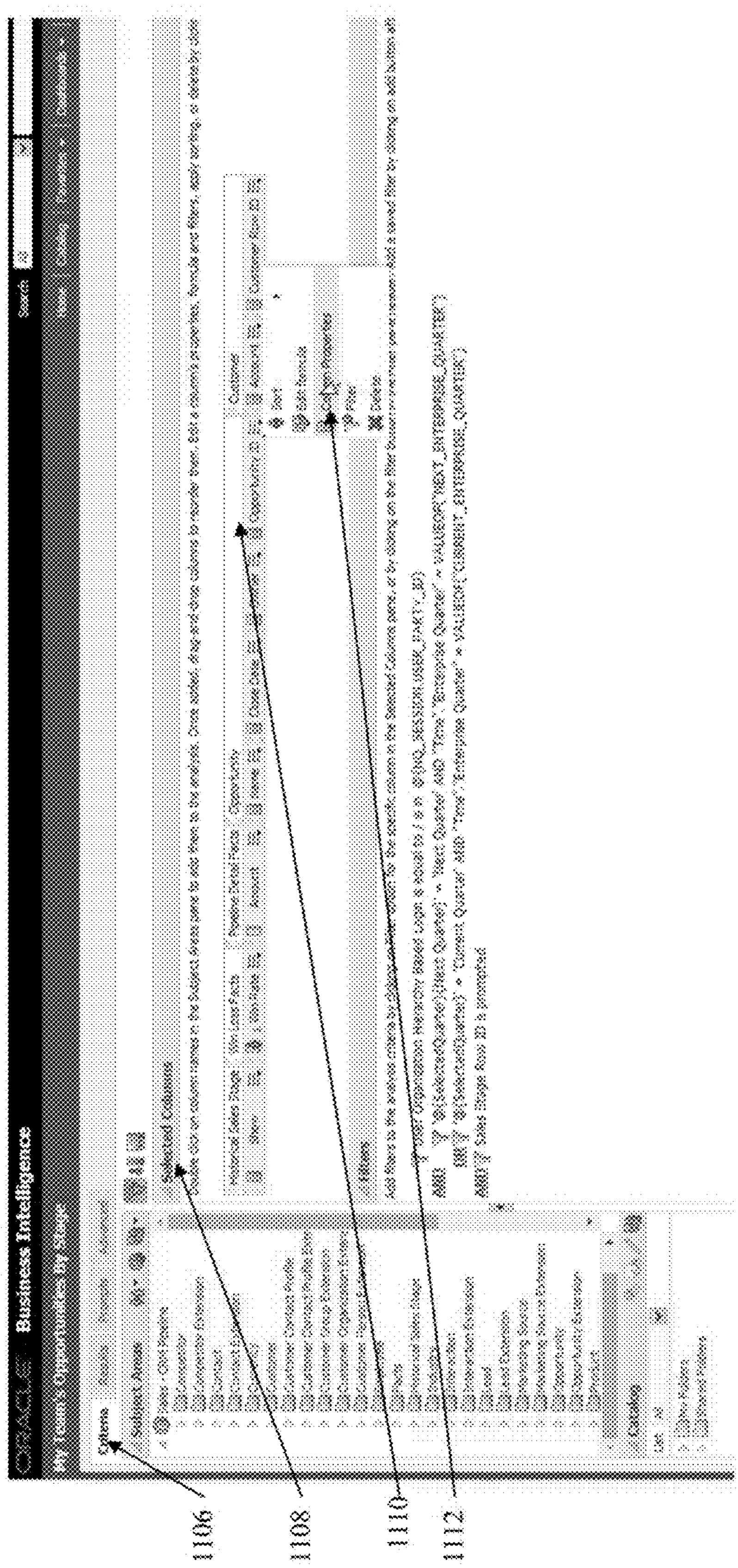

In order to link one or more items of the BI report to a detailed transaction report in ADF, the user configures an ADF contextual event such that the user is taken to the appropriate ADF report. Referring now to FIG. 11*b*, the criteria tab 1106 has been selected. The criteria tab allows the user to set one or more parameters related to the data of a selected BI report.

As shown in FIG. 11*b*, the system allows the user to configure one or more aspects of the BI report based on the column of the report. It should be appreciated that the column names of FIG. 11*a* correspond to those shown in the "Selected tabs" field 1108 is the same. The field 1108 allows the user to define parameters related to a particular column type. In the current example, the user has selected the "Opportunity ID" 1110 column to configure. When the user selects the 1110 control, the user may be presented with a set of drop-down options 1112. As shown in the example, the "column properties" option has been selected.

Figure 11C:
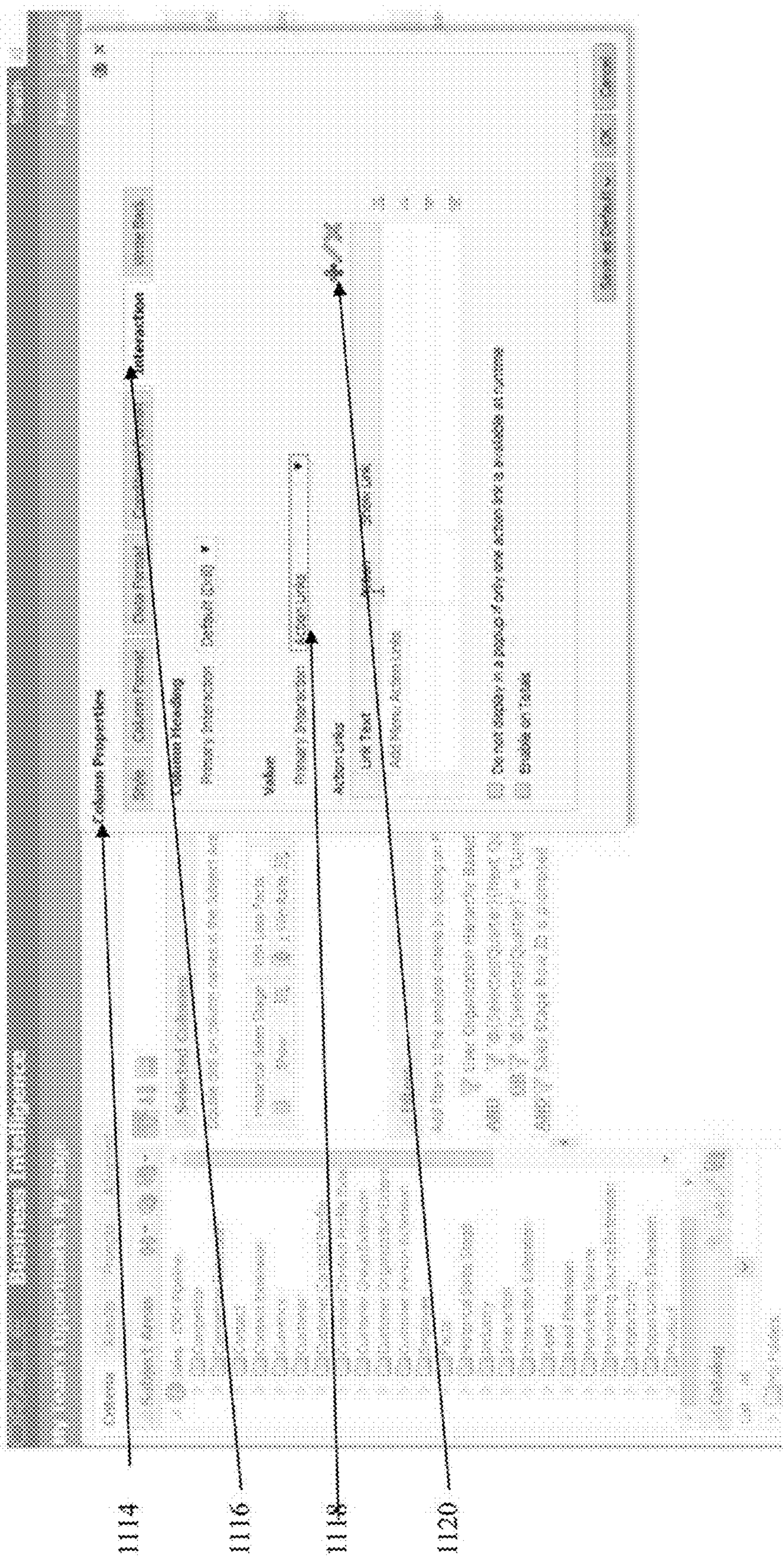

FIG. 11*c* illustrates a pop-up window 1114 that allows the user to select one or more column properties for the selected "Opportunities ID" field. The pop-up window 1114 comprises multiple tabs 1116 that the user may select to configure one or more types of column properties. For example, the style of the column, column format, data format etc., may be configured. In the illustrated embodiment, the Interaction tab has been selected, as shown in FIG. 11*c*.

In order to select an action link, the user may select action links from a drop-down menu 1118 to be presented with a set of action links options. The "plus" icon 1120 is actuated to add a desired action link as shown in the illustrated embodiment.

Figure 11D:
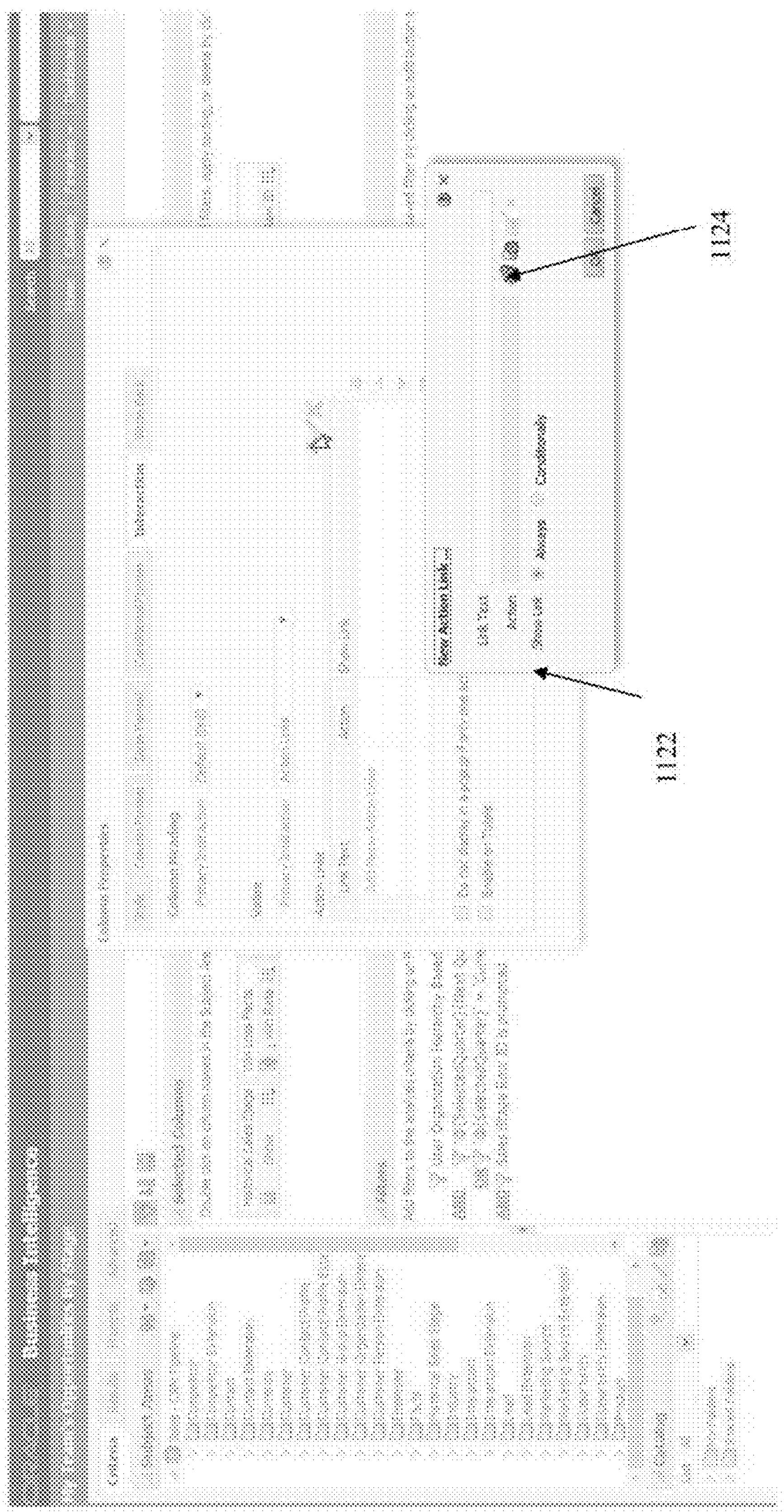
Figure 11E:
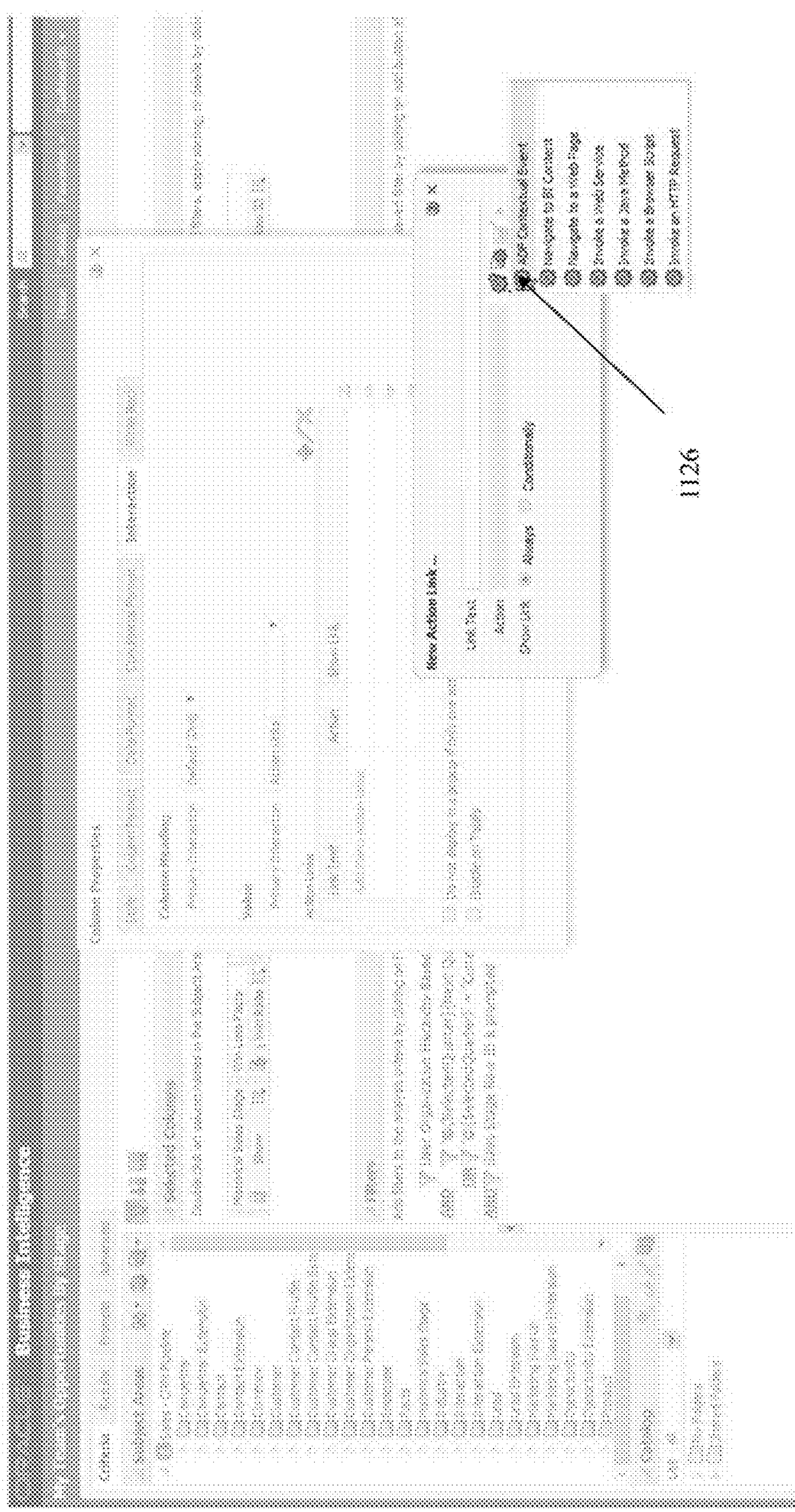
Figure 12:
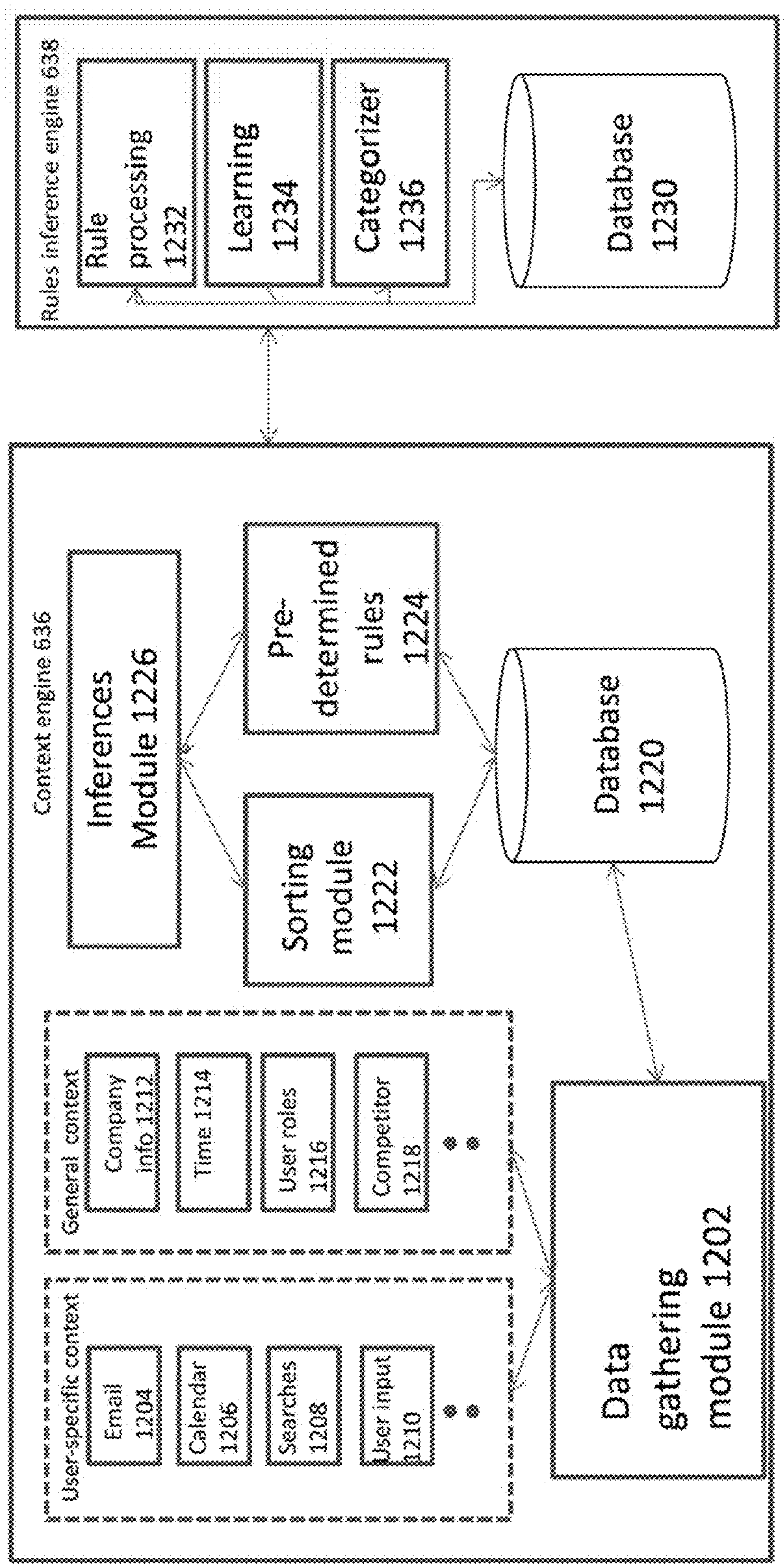
FIG. 12 illustrates a detailed system view of a context engine and a rules inference engine according to one or more embodiments.

FIG. 11*d* illustrates an example embodiment of a pop-up action link pop-up window 1120 that maybe populated in response to a selection of the "plus" icon 1120. The icon 1122 may be actuated to be taken to a list of action link properties, as illustrated in FIG. 11*e*. Referring now to FIG. 11*e*, the user is presented with a drop-down menu of action link options. The user may select "ADF Contextual Event" 1126 from the list of drop-down options. Thus, the user can configure the BI reports such that the user is navigated to the ADF report (as per the mapping module 634) when the Opportunities ID column is actuated. In other words, the name of the column, (e.g., Opportunities ID, in this case) is also passed as payload such that the Commit view displays the right ADF report based on the payload information of the contextual event. It should be appreciated that the mapping module 634 may also be consulted to determine the right ADF report. Thus, the system provides the user with the ability to configure multiple parameters, and allows the user to remain in control over the presented data.

It should be appreciated that both the BI reports and ADF report represent active data that are being accumulated over time, such that the most up to date version of the data is being presented to the user through the infolet infrastructure. For example, the performance tiles of the Glance View display active data analytics chart from the BI tool. Similarly, the Scan View, and the Scan List View also similarly display active data that is up-to-date, rather than static data retrieved from a database. Similarly, when the user drills down to the Commit View, the user has the ability to interact directly with the ADF report and modify/add new data points through the ADF report.

Although the above embodiments describe the infolets, and the contents presented to the user through the infolets as being specifically defined by the user/system administrator during a set-up or configuration time, other embodiments of the system may comprise a context engine to extrapolate a set of information to be presented to the user. For example, rather than the user/system administrator configuring the Glance view with the specific BI report (e.g., FIG. 10*a*), the system may instead automatically configure the infolet tiles based on a set of gathered information about the user and/or general contextual information.

For example, the system may configure a particular infolet tile based on a BI report most viewed/used by the user. Or, in another example, the system may determine a set of information to present in the infolet tiles based on a user's role in the enterprise. Or, in yet another example, the system may configure one or more tiles based on the user's Outlook® calendar entry. Or, in yet another example, the system may display information based on a current quarter such that the user is not unnecessarily burdened with sales figures from previous quarters, but rather only information from the present quarter.

Determining context within an enterprise may be especially helpful because relevant business details/opportunities/leads may be automatically inferred by a user's behavior or usage patterns to predict a set of items for a particular user. Although data tracking is widely used in many internet technologies, the scope of data collection and prediction is somewhat limited in most cases due to privacy and security concerns. However, in the space of enterprise software, the enterprise owns a large part of data exchanged, collected and analyzed by its employees. Thus, data obtained from Enterprise applications (e.g., Official email, reports, applications, etc.) may be leveraged to successfully make a set of inferences about an individual user, and to determine a more accurate context. Given that the volume of data available in an enterprise space is bound to be greater than that accessible in non-enterprise solutions, more accurate predictions may be made in determining the context surrounding one or more business transactions.

To this end, as shown in FIG. 6, one or more embodiments may comprise a context engine to determine one or more contexts based on which to populate one or more infolet tiles. Referring to FIG. 6, the context engine 636 collects a set of data from the user, and general information, through a data gathering module 1202. The data gathering module 1202 collects data from both user-specific sources (e.g., email 1204, calendar 1206, user searches 1208, user input 1210, voice recordings, etc.) and general context (e.g., company info 1212, time 1214, user roles 1216, competitor info 1218, etc.)

It should be appreciated that the illustrated sources of data are example sources only, and are not meant to be limiting. Similarly, any number of user-generated or general context sources may be used to gather data on the user. For example, data from a user's Outlook® calendar entry may be collected to determine a lunch meeting with another user. The context engine may use this information to make an inference on the other user. For example, the calendar entry may comprise "Lunch with John." The context engine, based on a set of collected information, may infer that the lunch is most probably with John Doe, who works in the same team as the user, for example. This information may be used in the context on infolets to provide only the relevant data to the user.

In another example, the context may be derived from general context data. For example, the system may determine time (e.g., end of business year, etc.), and may populate the infolet tiles based on the user's needs at the end of the business year. For example, if the user is a sales rep, total sales figures, opportunities, bonus information, etc. may be more relevant than during other times of the year. Or, in another example, the context may be a user's role or position within an enterprise. For example a "Goals" figure for a junior sales rep may be lower than that for a senior sales rep. Thus, the infolets tiles presented to the junior sales rep may be different than the infolets tiles presented to the senior sales rep. Thus, the system may gather user-specific and general context from a variety of sources. The gathered data may be stored in a database 1220

In one or more embodiments, the context engine may further comprise a sorting module 1222 to sort the gathered data into a set of new and/or most relevant data. For example, the sorting module 1222 may delete copies of redundant data, identify new context data, etc. In one or more embodiments, the context engine may further comprise a set of predetermined rules 1224 that help the context engine make inferences. For example, a rule/inference may be "During the last month of the year, the user is likely to be interested in viewing Annual Sales Report." Or, in another example, another rule/inference may be "A user is more likely to have lunch with a team mate." The preceding two examples are simple embodiments; it should be appreciated that more complex rules/inferences may be similarly defined during design time and stored in the set of predetermined rules 1224.

In one or more embodiments, the context engine may use the predetermined rules 1224 and the sorted data from the sorting module 1222 to make a set of user-specific inferences in the inferences module 1226. Following the above examples, the system may use a set of lunch appointments of a user, information about the user's team, and the rule "A user is more likely to have lunch with a team mate," to infer that it is likely that the user had lunch with John Doe. Similarly, other user specific inferences may be made at the inferences module 1226.

In one or more embodiments, the set of inferences may be sent to the rules inference engine 638, and stored in the database 1230. The rules inference engine may further comprise a categorizer 1236 to categorize the set of rules/inferences, a learning module 1234 to learn a set of patterns of the user, to form further rules or inferences, and a rule processing module 1232 to process the set of inferences received from the context engine. In one or more embodiments, the set of inferences may also be used as input into the infolet system.

By understanding context and making a set of inferences, the system makes it easier for employees to participate within the enterprise application system. Thus, rather than the user having the hard code or configure all the infolets/reports individually, the automatic inferences make the infolets even more useful to the user while minimizing the amount of work required on part of the user. It is postulated that the inferences based on which infolet tiles are populated/configured may increase participation of employees within an enterprise because it will likely be more effective in presenting information most relevant to the user but minimizing unnecessary work for the user in configuring the tiles.

Figure 13:
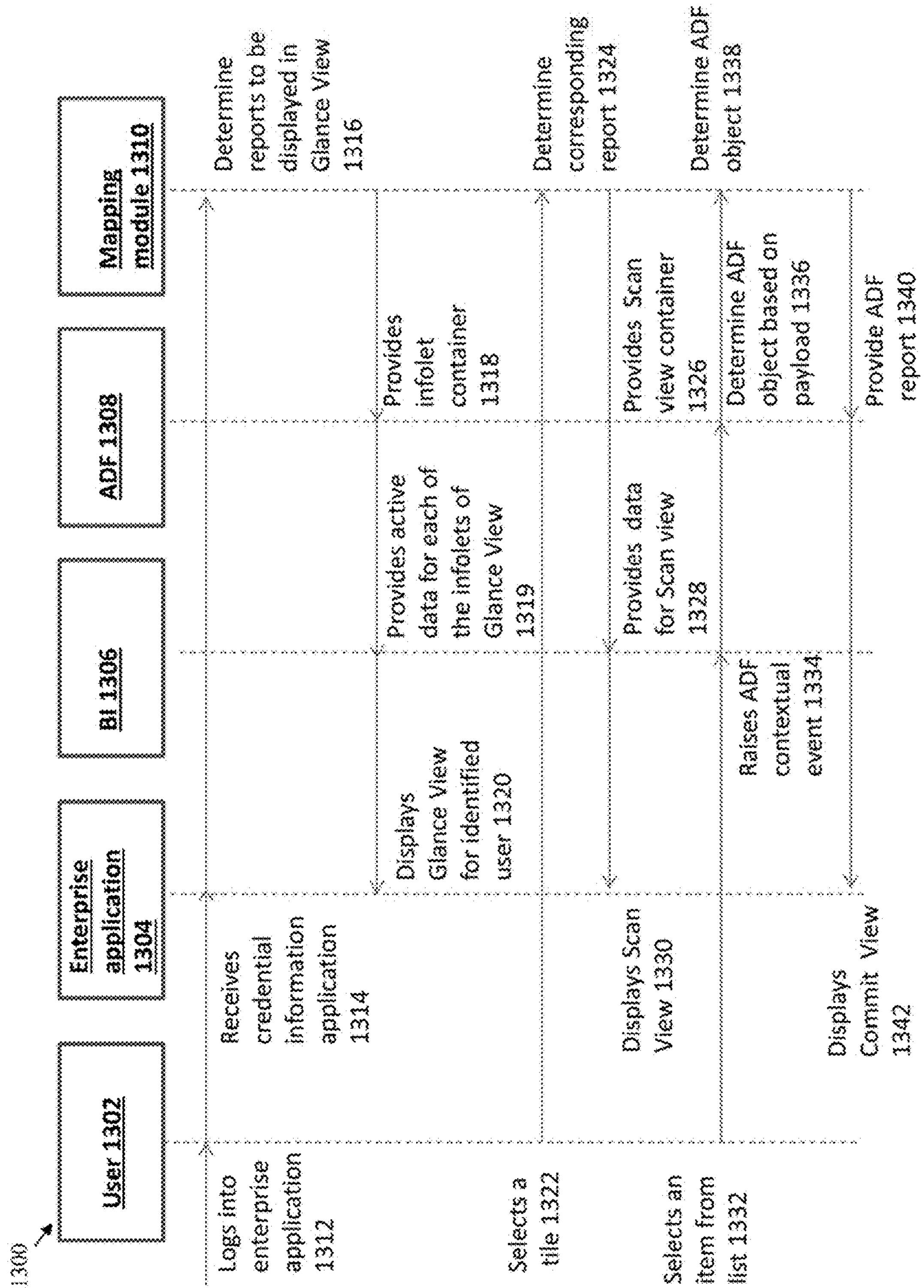
FIG. 13 illustrates a flowchart of actions taken to provide increasing depth level of information according to one or more embodiments.

Referring now to FIG. 13, a process flow 1300 illustrating an example method of using the infolet system is shown. At 1312, the user 1302 logs into the enterprise application. Based on the login information, at 1314, the enterprise application 1304 receives the user's login credentials and identifies the user 1302. At 1316, the mapping module 1310 determines one or more reports to be displayed to the user based on the user's identification. At 1318, the ADF 1308 provides the container for the infolet view (i.e., Glance View). At 1319, the BI 1306 provides one or more BI reports to be displayed in the ADF containers. At 1320, the enterprise application 1304 displays the Glance View to the user 1302.

At 1322, the user selects a particular tile from the displayed Glance View. At 1324, the mapping module 1310 determines a corresponding report based on the user's selection to be displayed in a Scan view to the user. At 1326, the ADF 1308 provides the container for the Scan View. At 1328, the BI 1306 provides the BI report to be populated in the Scan view. It should be appreciated that ADF reports may be similarly populated in the Scan View. At 1330, the enterprise application 1304 displays the Scan View to the user 1302.

At 1332, the user 1302 selects a particular data object from the list of the Scan. View. At 1334, the column of the BI report that the user selects raises a contextual event. At 1336, the ADF 1308 determines the ADF report based on the payload of the raised contextual event. At 1338, the mapping module 1310 determines the corresponding ADF report. At 1340, the ADF 1308 provides the ADF report. At 1342, the enterprise application 1304 displays the ADF report in the Commit View.

Figure 14:
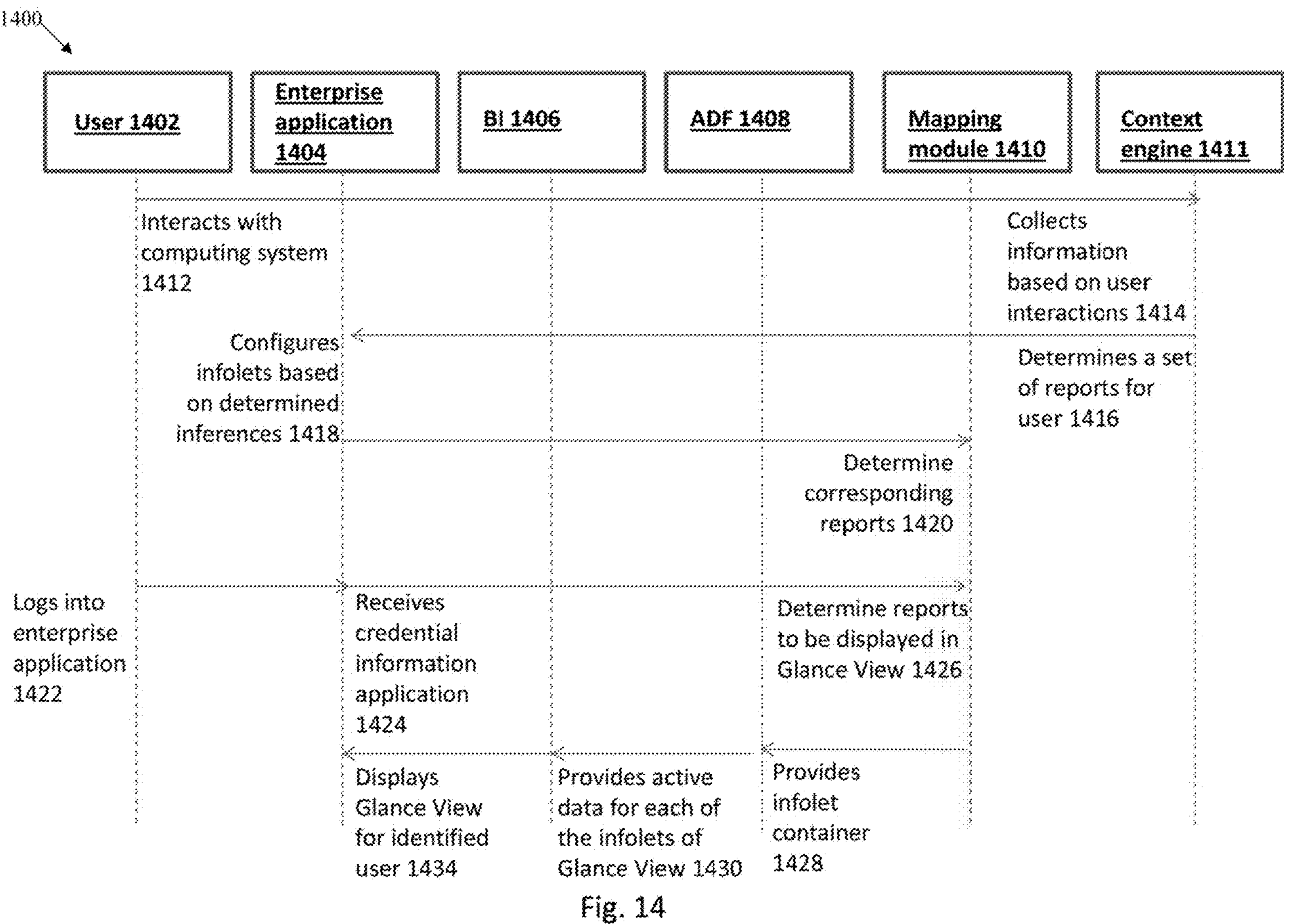
FIG. 14 illustrates another flowchart of actions taken to provide the multiple depth levels of information using the context engine according to one or more embodiments.

Referring now to FIG. 14, another process flow 1400 illustrating an example method of using the infolet system with the context engine is shown. At 1412, the user 1402 interacts with a computing system controlled by the enterprise. For example, employees may be given work computers and access to work email, etc. At 1414, the context engine 1411 collects data on the user's interaction with the computing system. At 1416, the context engine makes a set of inferences about the user over time based on the tracked data, and determines a set of reports/data that the user is likely to be interested in.

At 1418, the enterprise application 1404, in conjunction with the context engine 1411, configures the infolet system based on the set of reports/data determined by the context engine 1411. At 1420, the mapping module 1410 determines corresponding reports to infolet tiles, and stores a complete set of mapping information for the one or more infolet tiles.

At 1422, the user 1402 logs into the enterprise application. Based on the login information, at 1424 the enterprise application 1404 receives the user's login credentials and identifies the user 1402. At 1426, the mapping module 1410 determines one or more reports to be displayed to the user based on the user's identification. At 1428, the ADF 1408 provides the container for the infolet view (i.e., Glance View). At 1430, the BI 1406 provides one or more BI reports to be displayed in the ADF containers. At 1432, the enterprise application 1404 displays the Glance View to the user 1402.

It should be appreciated that the embodiments above may be implemented in a virtual tenancy model, in some embodiments. In a virtual tenancy model, rather than multiple business accounts sharing a single database such that activities related to one database table unnecessarily affects or taxes the remaining database tables associated with other business accounts, each business account is assigned its own dedicated server instance and a dedicated database that is unique to that particular business customer. This model is typically referred to as a virtual tenant model. The virtual tenant model gives the user more flexibility and control over the data generated and managed at the SaaS application, and may be advantageous in the context of displaying data in the infolet-style presentation style described in detail above.

Figure 15:
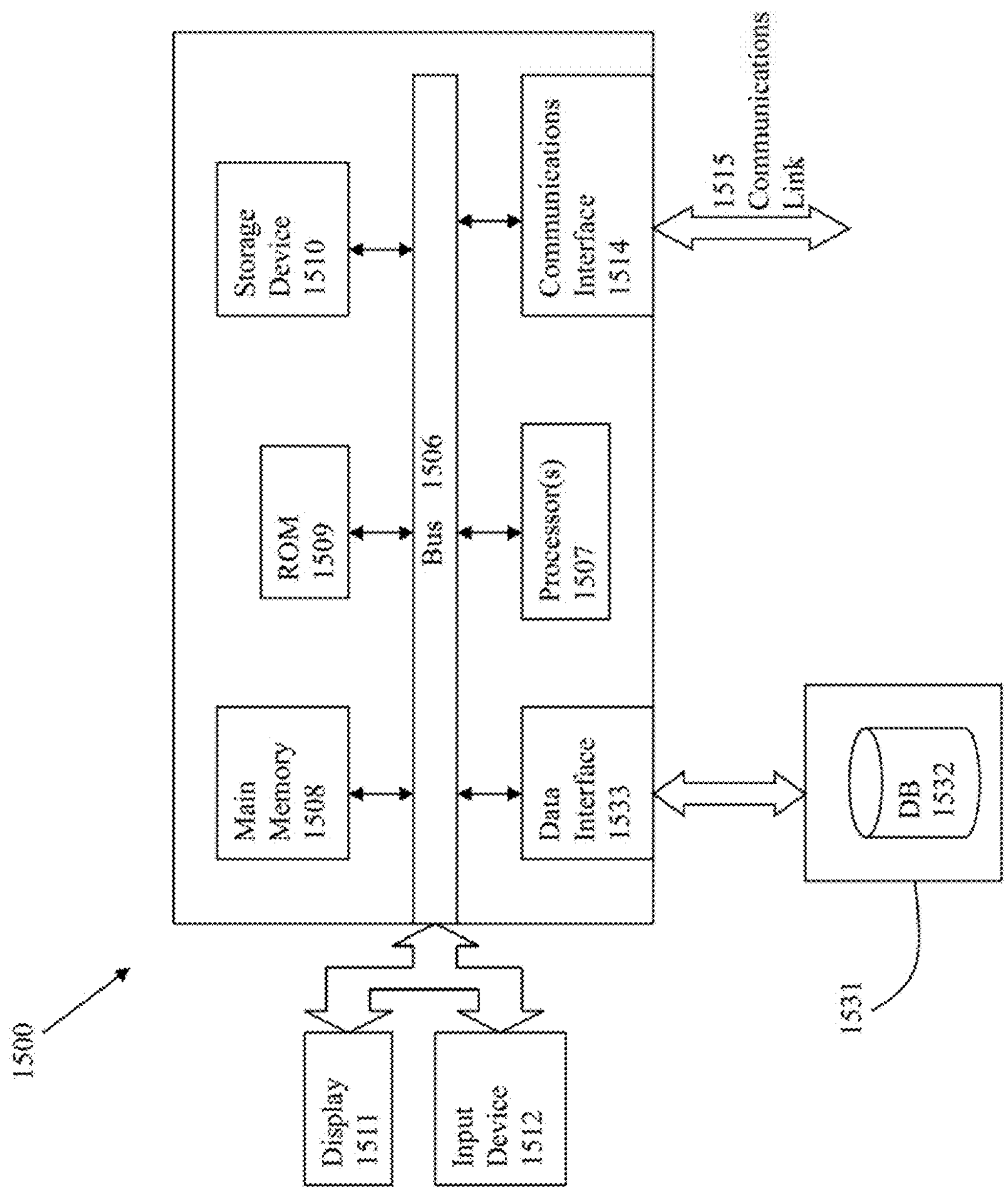
FIG. 15 depicts a computerized system on which an embodiment of the invention can be implemented.

FIG. 15 is a block diagram of an illustrative computing system 1500 suitable for implementing an embodiment of the present invention. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control.

According to one embodiment of the invention, computer system 1500 performs specific operations by processor 1507 executing one or more sequences of one or more instructions contained in system memory 1508. Such instructions may be read into system memory 1508 from another computer readable/usable medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1515 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of presenting enterprise data to a user, the method comprising:

providing a series of user interfaces to sequentially display multiple depths of information pertaining to a first dataset and a second dataset, the series of user interfaces comprising one or more view containers;

generating a first user interface of the series of user interfaces comprising one or more first level view containers, the one or more first level view containers display a first depth of information pertaining to the first dataset or the second dataset in response to receiving a user request, the first dataset comprising a first type of data, the first type of data comprising transactional data collected by a first application, the second dataset comprising a second type of data, the second type of data corresponding to data analytics generated by a second application based on at least the first type of data from the first dataset, a third dataset comprising a plurality of mappings between the first type of data and the second type of data;

receiving a first selection corresponding to a first level view container of the one or more first level view containers from the first user interface;

generating, in response to receiving the first selection corresponding to the first level view container, a second user interface of the series of user interfaces comprising at least a second level view container corresponding to the first level view container, the second level view container displays a second depth of information pertaining to the first dataset or the second dataset and to the first level view container, wherein the second depth of information is a more detailed depth of the first dataset or the second dataset as compared to the first depth of information, the first level view containers being displayed before the second level view container;

receiving a second selection corresponding to a second level view container from the second user interface; and generating, in response to receiving the second selection corresponding to the second level view container, a third user interface of the series of user interfaces comprising at least a third level view container corresponding to the second level view container, the third level view container displays a third depth of information pertaining to the first dataset or the second dataset and to the second level view container, wherein the third depth of information is a more detailed depth of the first dataset or the second dataset as compared to the second depth of information, the second level view container being displayed before the third level view container, and wherein at least one of the one or more first level view containers, second level view container, or third level view container comprises data from both the first dataset comprising the first type of data retrieved from the first application and the second dataset comprising the second type of data retrieved from the second application, the mappings comprising different mappings for first level view containers, second level view containers, and third level view containers, the mappings comprising at least a schema that links the first type of data from the first application to the second type of data from the second application.

2. The method of claim 1, wherein the first dataset corresponds to a first database, the second dataset corresponds to a second database, and the third dataset corresponds to a third database.

3. The method of claim 1, further comprising:

mapping the first depth of information to the second depth of information such that the second depth of information is retrieved in response to a selection of the first depth of information.

4. The method of claim 1, further comprising:

providing a configuration user interface to the user, the configuration user interface comprising one or more controls, wherein the one or more controls allow the user to select one or more datasets to be displayed through the series of user interfaces.

5. The method of claim 1, further comprising:

gathering a set of enterprise data;

making at least one inference about a preference of the user from the gathered set of enterprise data; and selecting the one or more first level view containers to be displayed through the series of user interfaces based on the at least one inference.

6. The method of claim 5, wherein the at least one inference is made based at least in part on a set of predetermined rules.

7. The method of claim 5, wherein the gathered set of enterprise data is specific to the user.

8. The method of claim 5, further comprising:

learning one or more patterns of the user based at least in part on the gathered set of enterprise data.

9. The method of claim 1, wherein the first application and the second application are built on a virtual tenant database model.

10. The method of claim 1, wherein the first application is different from the second application.

11. A computer program product embodied in a non-transitory computer readable medium, the computer readable medium having stored thereon a sequence of instructions which, when executed by a processor causes the processor to execute a method to present enterprise data to a user, the method comprising:

providing a series of user interfaces to sequentially display multiple depths of information pertaining to a first dataset and a second dataset, the series of user interfaces comprising one or more view containers;

generating a first user interface of the series of user interfaces comprising one or more first level view containers, the one or more first level view containers display a first depth of information pertaining to the first dataset or the second dataset in response to receiving a user request, the first dataset comprising a first type of data, the first type of data comprising transactional data collected by a first application, the second dataset comprising a second type of data, the second type of data corresponding to data analytics generated by a second application based on at least the first type of data from the first dataset, a third dataset comprising a plurality of mappings between the first type of data and the second type of data;

receiving a first selection corresponding to a first level view container of the one or more first level view containers from the first user interface;

generating, in response to receiving the first selection corresponding to the first level view container, a second user interface of the series of user interfaces comprising at least a second level view container corresponding to the first level view container, the second level view container displays a second depth of information pertaining to the first dataset or the second dataset and to the first level view container, wherein the second depth of information is a more detailed depth of the first dataset or the second dataset as compared to the first depth of information, the first level view containers being displayed before the second level view container;

receiving a second selection corresponding to a second level view container from the second user interface; and generating, in response to receiving the second selection corresponding to the second level view container, a third user interface of the series of user interfaces comprising at least a third level view container corresponding to the second level view container, the third level view container displays a third depth of information pertaining to the first dataset or the second dataset and to the second level view container, wherein the third depth of information is a more detailed depth of the first dataset or the second dataset as compared to the second depth of information, the second level view container being displayed before the third level view container, and wherein at least one of the one or more first level view containers, second level view container, or third level view container comprises data from both the first dataset comprising the first type of data retrieved from the first application and the second dataset comprising the second type of data retrieved from the second application, the mappings comprising different mappings for first level view containers, second level view containers, and third level view containers, the mappings comprising at least a schema that links the first type of data from the first application to the second type of data from the second application.

12. The computer program product of claim 11, wherein the first dataset corresponds to a first database, the second dataset corresponds to a second database, and the third dataset corresponds to a third database.

13. The computer program product of claim 11, further comprising:

mapping the first depth of information to the second depth of information such that the second depth of information is retrieved in response to a selection of the first depth of information.

14. The computer program product of claim 11, further comprising:

providing a configuration user interface to the user, the configuration user interface comprising one or more controls, wherein the one or more controls allow the user to select one or more datasets to be displayed through the series of user interfaces.

15. The computer program product of claim 11, further comprising:

gathering a set of enterprise data;

making at least one inference about a preference of the user from the gathered set of enterprise data; and selecting the one or more first level view containers to be displayed through the series of user interfaces based on the at least one inference.

16. The computer program product of claim 15, wherein the at least one inference is made based at least in part on a set of predetermined rules.

17. The computer program product of claim 15, wherein the gathered set of enterprise data is specific to the user.

18. The computer program product of claim 15, further comprising:

learning one or more patterns of the user based at least in part on the gathered set of enterprise data.

19. The computer program product of claim 11, wherein the first application and the second application are built on a virtual tenant database model.

20. The computer program product of claim 11, wherein the first application is different from the second application.

21. A computer system for presenting enterprise data to a user, the computer system comprising:

a computer processor to execute a set of program code instructions;

a memory to hold the set of program code instructions, in which the set of program code instructions, when executed, cause the following acts:

providing a series of user interfaces to sequentially display multiple depths of information pertaining to a first dataset and a second dataset, the series of user interfaces comprising one or more view containers;

generating a first user interface of the series of user interfaces comprising one or more first level view containers, the one or more first level view containers display a first depth of information pertaining to the first dataset or the second dataset in response to receiving a user request, the first dataset comprising a first type of data, the first type of data comprising transactional data collected by a first application, the second dataset comprising a second type of data, the second type of data corresponding to data analytics generated by a second application based on at least the first type of data from the first dataset, a third dataset comprising a plurality of mappings between the first type of data and the second type of data;

receiving a first selection corresponding to a first level view container of the one or more first level view containers from the first user interface;

generating, in response to receiving the first selection corresponding to the first level view container, a second user interface of the series of user interfaces comprising at least a second level view container corresponding to the first level view container, the second level view container displays a second depth of information pertaining to the first dataset or the second dataset and to the first level view container, wherein the second depth of information is a more detailed depth of the first dataset or the second dataset as compared to the first depth of information, the first level view containers being displayed before the second level view container;

receiving a second selection corresponding to a second level view container from the second user interface; and generating, in response to receiving the second selection corresponding to the second level view container, a third user interface of the series of user interfaces comprising at least a third level view container corresponding to the second level view container, the third level view container displays a third depth of information pertaining to the first dataset or the second dataset and to the second level view container, wherein the third depth of information is a more detailed depth of the first dataset or the second dataset as compared to the second depth of information, the second level view container being displayed before the third level view container, and wherein at least one of the one or more first level view containers, second level view container, or third level view container comprises data from both the first dataset comprising the first type of data retrieved from the first application and the second dataset comprising the second type of data retrieved from the second application, the mappings comprising different mappings for first level view containers, second level view containers, and third level view containers, the mappings comprising at least a schema that links the first type of data from the first application to the second type of data from the second application.

22. The computer system of claim 21, wherein the first dataset corresponds to a first database, the second dataset corresponds to a second database, and the third dataset corresponds to a third database.

23. The computer system of claim 21, the acts further comprising mapping the first depth of information to the second depth of information such that the second depth of information is retrieved in response to a selection of the first depth of information.

24. The computer system of claim 21, the acts further comprising:

providing a configuration user interface to the user, the configuration user interface comprising one or more controls, wherein the one or more controls allow the user to select one or more datasets to be displayed through the series of user interfaces.

25. The computer system of claim 21, the acts further comprising:

gathering a set of enterprise data;

making at least one inference about a preference of the user from the gathered set of enterprise data; and selecting the one or more first level view containers to be displayed through the series of user interfaces based on the at least one inference, wherein the at least one inference is made based at least in part on a set of predetermined rules and the gathered set of enterprise data is specific to the user.

26. The computer system of claim 21, wherein the first application is different from the second application, and the first application and the second application are built on a virtual tenant database model.

* * * * *

UNITED STATES PATENT AND TRADEMARK OFFICE

CERTIFICATE OF CORRECTION

PATENT NO. : 9,971,469 B2
APPLICATION NO. : 14/611111
DATED : May 15, 2018
INVENTOR(S) : Pacalin et al.

It is certified that error appears in the above-identified patent and that said Letters Patent is hereby corrected as shown below:

In the Specification

In Column 14, Line 45, delete "event" and insert -- event. --, therefor.

In Column 16, Line 61, delete "1220" and insert -- 1220. --, therefor.

In Column 19, Line 30, delete "PTSN," and insert -- PSTN, --, therefor.

Signed and Sealed this
Sixth Day of November, 2018

Andrei Iancu
*Director of the United States Patent and Trademark Office*